US006823367B1

(12) United States Patent
Wakasugi et al.

(10) Patent No.: US 6,823,367 B1
(45) Date of Patent: Nov. 23, 2004

(54) METHOD AND APPARATUS FOR MANAGING COMMUNICATION INFORMATION COLLECTIVELY IN COMMUNICATION TERMINAL DEVICE

(75) Inventors: Naoki Wakasugi, Kanagawa (JP); Tetsuya Kawaguchi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 705 days.

(21) Appl. No.: 09/665,499

(22) Filed: Sep. 19, 2000

(30) Foreign Application Priority Data

| Sep. 24, 1999 | (JP) | 11-271053 |
| Oct. 18, 1999 | (JP) | 11-295532 |
| Jan. 14, 2000 | (JP) | 2000-006475 |
| Apr. 24, 2000 | (JP) | 2000-122891 |

(51) Int. Cl.[7] .......................... G06F 15/16; G06F 13/00
(52) U.S. Cl. .................. 709/206; 709/200; 709/203; 709/206; 709/207; 709/213; 709/217; 709/218; 709/225; 709/227; 358/402; 358/403; 358/404; 358/405
(58) Field of Search ................... 709/206, 200, 709/207, 213, 218, 225, 227, 203, 217; 358/402–405, 1.15

(56) References Cited

U.S. PATENT DOCUMENTS

| 5,675,733 A | * | 10/1997 | Williams | 709/206 |
| 5,815,555 A | | 9/1998 | Cairo | |
| 5,850,520 A | * | 12/1998 | Griebenow et al. | 709/206 |
| 6,020,980 A | * | 2/2000 | Freeman | 358/402 |
| 6,088,125 A | * | 7/2000 | Okada et al. | 358/405 |
| 6,178,442 B1 | * | 1/2001 | Yamazaki | 709/206 |
| 6,237,027 B1 | * | 5/2001 | Namekawa | 709/206 |
| 6,314,454 B1 | * | 11/2001 | Wang et al. | 709/206 |
| 6,437,873 B1 | * | 8/2002 | Maeda | 358/1.15 |
| 6,441,916 B1 | * | 8/2002 | Toyoda | 358/1.15 |
| 6,496,573 B1 | * | 12/2002 | Ichimura | 379/100.06 |
| 6,618,747 B1 | * | 9/2003 | Flynn et al. | 709/206 |
| 6,618,749 B1 | * | 9/2003 | Saito et al. | 709/207 |

FOREIGN PATENT DOCUMENTS

| EP | 0923034 | 6/1999 |
| JP | 11-15755 | 1/1999 |

OTHER PUBLICATIONS

Masinter L. et al., "Extended Facsimile Using Internet Mail", Mar. 1999, pp. 1–12.

* cited by examiner

Primary Examiner—Ario Etienne
(74) Attorney, Agent, or Firm—Cooper & Dunham LLP

(57) ABSTRACT

A communication terminal device that transmits electronic mail through a network by a mail system thereon, is provided in which the communication terminal device receives delivery confirmation mail from the mail system when an electronic mail transmission by the mail system was successful, and error mail from the mail system when the electronic mail transmission was failed. When the communication terminal device has received the delivery confirmation mail or the error mail, it stores a result of the electronic mail transmission including in its memory.

56 Claims, 29 Drawing Sheets

FIG.8

COMMUNICATION MANAGEMENT TABLE 4a

| RECORD NUMBER | SEND/ RECEIVE | DATE | TIME | COMMUNICATION MANAGEMENT INFORMATION ||||||
|---|---|---|---|---|---|---|---|---|---|
| | | | | ADDRESS | MODE | COMMUNI -CATION TIME | PAGE | RESULT | FILE NUMBER |
| 01 | SEND | 02/04 | 15:48 | ifaxb@xyz.co.jp | Mail | 0'10" | 1 | — | 0001 |
| 02 | RECEIVE | 02/05 | 09:15 | 0312345678 | G3 | 1'30" | 3 | OK | 0002 |
| ..... | ..... | ..... | ..... | ..... | ..... | ..... | ..... | ..... | ..... |

FIG.9

COMMUNICATION MANAGEMENT REPORT

<SENT>

| DATE | TIME | ADDRESS | MODE | DURATION | PAGE | RESULT | FILE NUMBER |
|------|------|---------|------|----------|------|--------|-------------|
| 02/04 | 15:48 | ifaxb@xyz.co.jp | Mail | 0'10" | 1 | -- | 0001 |

<RECEIVED>

| DATE | TIME | ADDRESS | MODE | DURATION | PAGE | RESULT | FILE NUMBER |
|------|------|---------|------|----------|------|--------|-------------|
| 02/05 | 09:15 | 0312345678 | G3 | 1'30" | 3 | OK | 0002 |

FIG.11

COMMUNICATION MANAGEMENT TABLE ~4a

| RECORD NUMBER | COMMUNICATION MANAGEMENT INFORMATION | | | | | | | | |
|---|---|---|---|---|---|---|---|---|---|
| | SEND/ RECEIVE | DATE | TIME | ADDRESS | MODE | COMMUNI-CATION TIME | PAGE | RESULT | FILE NUMBER |
| 01 | SEND | 02/04 | 15:48 | ifaxb@xyz.co.jp | Mail | 0'10" | 1 | OK | 0001 |
| 02 | RECEIVE | 02/05 | 09:15 | 0312345678 | G3 | 1'30" | 3 | OK | 0002 |
| ..... | ..... | ..... | ..... | ..... | ..... | ..... | ..... | ..... | ..... |

FIG.12

COMMUNICATION MANAGEMENT REPORT

<SENT>

| DATE | TIME | ADDRESS | MODE | DURATION | PAGE | RESULT | FILE NUMBER |
|---|---|---|---|---|---|---|---|
| 02/04 | 15:48 | ifaxb@xyz.co.jp | Mail | 0'10" | 1 | OK | 0001 |

<RECEIVED>

| DATE | TIME | ADDRESS | MODE | DURATION | PAGE | RESULT | FILE NUMBER |
|---|---|---|---|---|---|---|---|
| 02/05 | 09:15 | 0312345678 | G3 | 1'30" | 3 | OK | 0002 |

FIG.16

COMMUNICATION MANAGEMENT TABLE ~4a

| RECORD NUMBER | COMMUNICATION MANAGEMENT INFORMATION ||||||||| 
|---|---|---|---|---|---|---|---|---|
| | SEND/ RECEIVE | DATE | TIME | ADDRESS | MODE | COMMUNI -CATION TIME | PAGE | RESULT | FILE NUMBER |
| 01 | SEND | 02/04 | 15:48 | ifaxb@xyz.co.jp | Mail | 0'10" | 1 | ERR | 0001 |
| 02 | RECEIVE | 02/05 | 09:15 | 0312345678 | G3 | 1'30" | 3 | OK | 0002 |
| ..... | ..... | ..... | ..... | ..... | ..... | ..... | ..... | ..... | ..... |

FIG.17

COMMUNICATION MANAGEMENT REPORT

⟨SENT⟩

| DATE | TIME | ADDRESS | MODE | DURATION | PAGE | RESULT | FILE NUMBER |
|---|---|---|---|---|---|---|---|
| 02/04 | 15:48 | ifaxb@xyz.co.jp | Mail | 0'10" | 1 | ERR | 0001 |

⟨RECEIVED⟩

| DATE | TIME | ADDRESS | MODE | DURATION | PAGE | RESULT | FILE NUMBER |
|---|---|---|---|---|---|---|---|
| 02/05 | 09:15 | 0312345678 | G3 | 1'30" | 3 | OK | 0002 |

FIG.23

| USER CODE/MAIL ADDRESS CONVERSION TABLE ||
|---|---|
| USER CODE | MAIL ADDRESS |
| 1 2 3 4 | wsa1@abc.co.jp |
| 2 3 4 5 | wsa2@abc.co.jp |
| ⋮ | ⋮ |

4c

| COMMUNICATION REFERENCE NUMBER |
| --- |
| STARTING DATE/TIME |
| COMMUNICATION TIME |
| TOTAL NUMBER OF PAGES |
| FILE NUMBER |
| ADDRESS FILE ID |
| CLASSIFICATION |
| LINE DENSITY |
| TIME SPECIFICATION |
| SEND/RECEIVE DISTINCTION |
| COMMUNICATION RESULT |

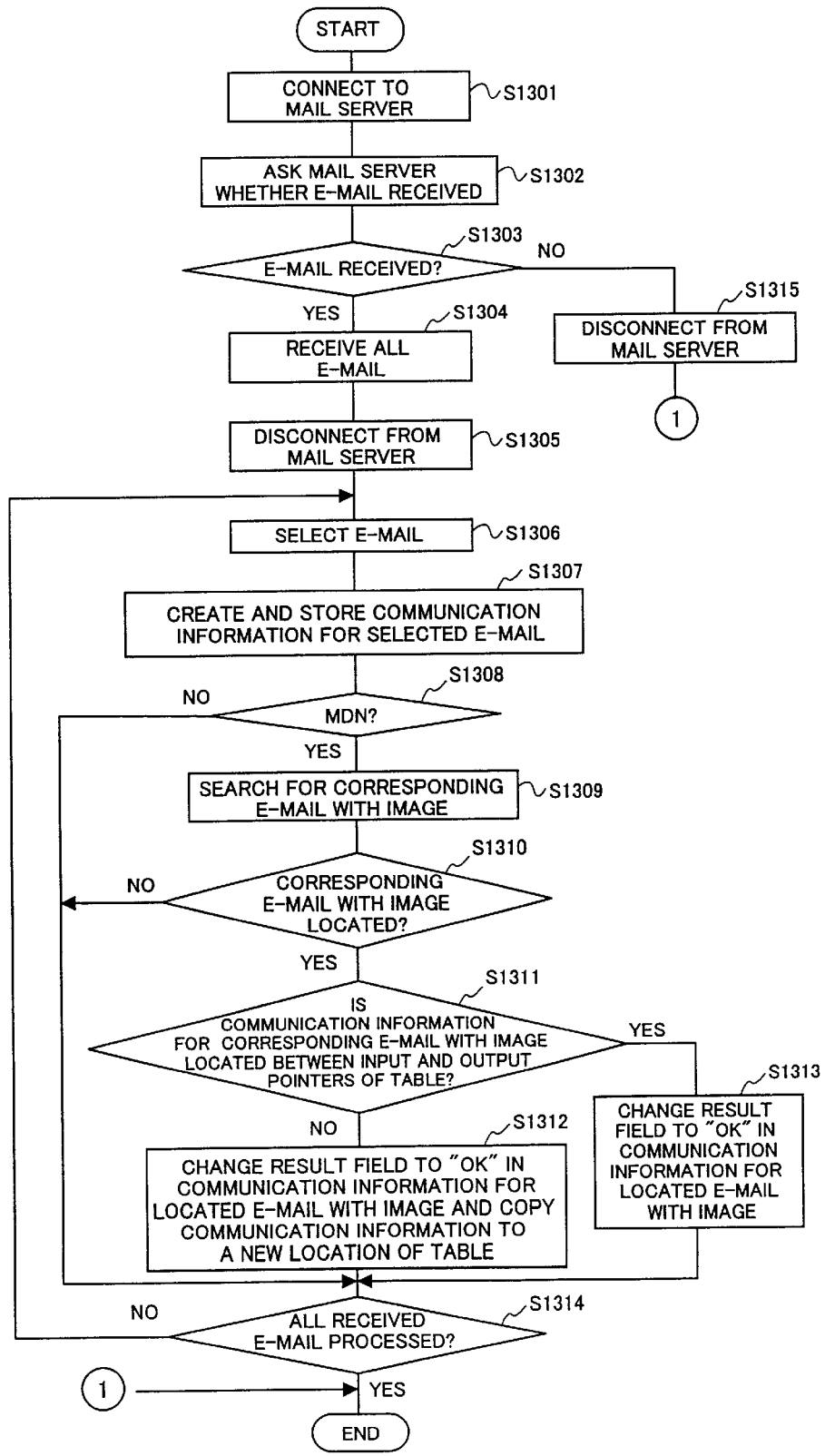

METHOD AND APPARATUS FOR MANAGING COMMUNICATION INFORMATION COLLECTIVELY IN COMMUNICATION TERMINAL DEVICE

BACKGROUND OF THE INVENTION

1. Field of the Invention

The present invention relates to a communication terminal device that transmits electronic mail through a network by a mail system thereon, and its controlling method, and further relates to a network facsimile device that has functions to exchange image information with use of electronic mail by connecting to the Internet, to create a send/receive history information table about the electronic mail, and to visibly output a communication management report that displays contents of the send/receive history information table as a list, and its controlling method.

2. Description of the Related Art

Recently, with the increase in number of Internet users, a communication method using electronic mail has become more common.

A content of the electronic mail is mainly readable text data, image information, binary data, or the like that may be exchanged between a user and an other party by being encoded and decoded by an encode/decode method based on BASE 64 that is compliant to MIME (Multipurpose Internet Message Extension).

A process to send or receive electronic mail by a communication terminal device that is connected to a network is described below. A communication terminal device of a sender sends the electronic mail with a specified mail address through the Internet to a mail server (MTA: Message Transfer Agent) that is located on the sender's side. Subsequently, the mail server transfers the electronic mail by a fixed electronic mail transmission protocol such as SMTP (Simple-mail Transfer Protocol) through the Internet to a mail server (MTA) that is located on a receiver's side. The mail server (MTA) on the receiver's side stores the received electronic mail in an individual mailbox for the specified mail address of a communication terminal device of the receiver. The communication terminal device on the receiver's side periodically accesses the mail server on the receiver's side by a mail reception protocol such as POP (Post Office Protocol) 3 through the Internet, and obtains the electronic mail that has been received and stored in the individual mailbox for that communication terminal device.

According to a conventional electronic mail system, in the case that the communication terminal device sends the electronic mail by the mail system operating on the network, the communication terminal device on the sender's side can confirm that the electronic mail has been sent to the mail server on the sender's side. However, the communication terminal device on the receiver's side cannot confirm that the electronic mail has arrived at the mail address on the receiver's side.

In order to eliminate the above-described disadvantage of the conventional electronic mail system, several mail delivery confirmation methods have been suggested in RFC (Request For Comment) as follows.

One of the methods is named DSN (Delivery Status Notification) and confirms a mail delivery at a SMTP command level. When electronic mail is stored in a mailbox of the mail server (MTA) on the receiver's side, the mail server returns delivery confirmation mail to the sender of the electronic mail, which method is referred to as RFC 1891 and RFC 1894. However, this method does not allow the sender to confirm that the receiver has actually checked the electronic mail with use of an UA (User Agent) such as an electronic mail processing software or the like.

Additionally, another method named MDN (Message Disposition Notification) provides a "Disposition-Notification-To:" field in a mail header of electronic mail, describes a mail address to which the electronic mail is sent, and requests a mail delivery confirmation, which method is referred to RFC 2298.

Another method to confirm a mail delivery is for the UA that receives the electronic mail to simply send delivery confirmation mail to the mail address located in a "From:" field of the electronic mail received.

In addition to a method for confirming a mail delivery, a system described in Japanese Laid-Open Patent Application No. 11-15755 discloses a method to return error mail to the sender of the electronic mail by the mail server (MTA) on the receiver's side when the mail address specified by the electronic mail transmitted by the sender does not exist.

On the other hand, in a communication terminal device that exchanges data with an other party's communication terminal device by establishing a connection to the other party through a public network, information obtained at each communication, for example, a date, a time, an address, a duration and a result of the communication, is recorded as communication management information in a communication management table. Subsequently, a communication management report based on contents of the communication management information is printed out by a plotter so as to be visible on paper, in response to a fixed input operation or for each fixed number of communications.

In the above-described case, if an electronic mail transmission to the other party is successful, a communication result field in the communication management information is set to "OK". If the electronic mail transmission failed, the communication result field in the communication management information is set to "ERR".

However, since the above-described delivery confirmation or error notification is received only as electronic mail, which may simply be printed out on paper or displayed on a monitor, a result thereof is not conventionally reflected in the communication result field in the communication management information.

A network facsimile device including functions to exchanges image information with use of electronic mail by connecting to the Internet, to create a send/receive history information table for every electronic mail sent or received, and to visibly output a communication management report displaying contents of the send/receive history information table as a list is practically used.

In such a network facsimile device, ITU-T advice T.37 is adapted as technical advice related to an electronic mail communication function for communicating image information with use of electronic mail.

When exchanging image information using the electronic mail, the mail delivery confirmation method as described above becomes a problem.

The electronic mail is basically a storage-type application, and a sender cannot confirm that the transmitted image information has arrived correctly at a communication terminal device that is located on a receiver's side, unlike a conventional facsimile application that communicates with the other party in real time over a public network.

Accordingly, the delivery confirmation of the image information can be performed by including a function to request the delivery confirmation mail in the network facsimile device.

However, when receiving the delivery confirmation mail, the network facsimile device cannot clearly indicate which electronic mail transmitted with image information corresponds to the delivery confirmation mail. As a result, the mail delivery confirmation function in the network facsimile device cannot effectively function.

SUMMARY OF THE INVENTION

Accordingly, it is a general object of the present invention to provide a method and an apparatus for managing collectively delivery confirmation mail and error mail that correspond to a transmitted electronic mail and are returned from an electronic mail system on a network, as communication management information in a communication terminal device, in which the disadvantages described above are eliminated.

The above-described objects of the present invention are achieved by a communication terminal device that transmits electronic mail through a network by a mail system thereon, said communication terminal device including a communication management table storing communication management information related to a communication using the electronic mail through the network, said communication management information including a communication result, a communication management report outputting unit that creates and outputs report data based on stored contents of said communication management table, a delivery confirmation mail detecting unit that detects delivery confirmation mail returned from the mail system on the network, said delivery confirmation mail corresponding to the electronic mail transmitted by the mail system, and a communication result adding unit that adds information indicating a communication success as the communication result in the communication management information related to the communication using the electronic mail, which communication management information is stored in said communication management table if said delivery confirmation mail detecting unit detects the delivery confirmation mail.

Other objects, features and advantages of the present invention will become more apparent from the following detailed description when read in conjunction with the accompanying drawings.

It should be note that, hereinafter, electronic mail is referred to as e-mail.

BRIEF DESCRIPTION OF THE DRAWINGS

FIG. 8 is a diagram showing a communication management table when the delivery confirmation mail or error mail is not received;

FIG. 9 is a diagram showing a communication management report created based on the communication management table shown in FIG. 8;

FIG. 11 is a diagram showing the communication management table after the delivery confirmation mail is received;

FIG. 12 is a diagram showing the communication management report created based on the communication management table shown in FIG. 11;

FIG. 16 is a diagram showing the communication management table after the error mail has been received;

FIG. 17 is a diagram showing the communication management report created based on the communication management table shown in FIG. 16;

FIG. 23 is a diagram showing contents of a user code-mail address conversion table;

FIG. 31 is a flowchart showing a second embodiment of the mail reception process by the network facsimile device FX.

DESCRIPTION OF THE PREFERRED EMBODIMENTS

A description will now be given of preferred embodiments of the present invention, with reference to the accompanying drawings.

Figure 1:
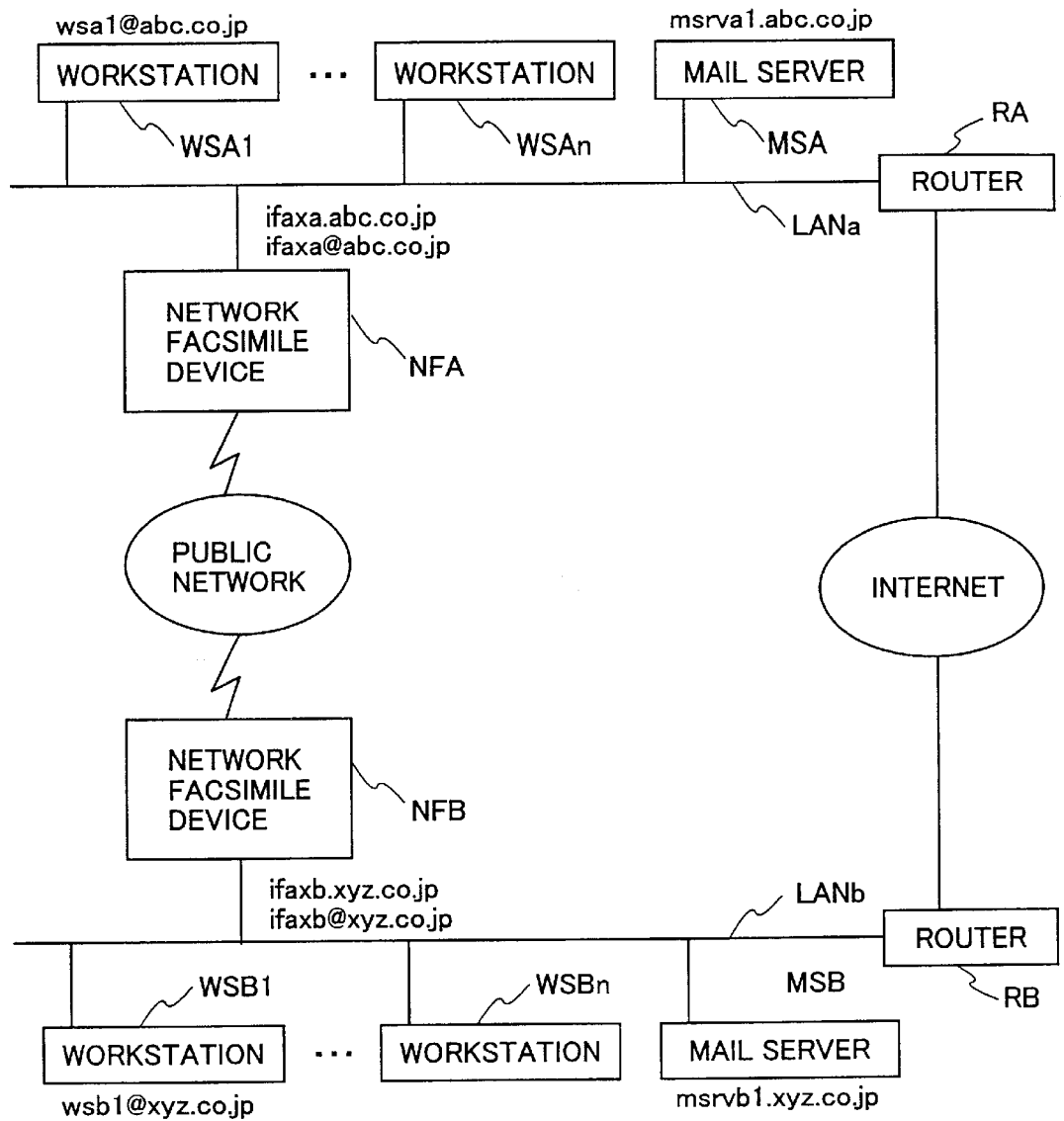
FIG. 1 is a block diagram showing a network system and a connection to a public network by a network facsimile device according to a first embodiment of the present invention.

FIG. 1 shows network connections to other communication terminal devices and to a public network by a network facsimile device as a communication terminal device according to a first embodiment of the present invention.

In FIG. 1, on a local area network LANa, workstations WSA1 through WSAn, a mail server MSA and a network facsimile device NFA are connected. The WSA1 through the WSAn have e-mail addresses "wsa1@abc.co.jp" through "wsan@abc.co.jp". The MSA has a network address "msrval.abc.co.jp". The NFA has a network address "ifaxa.abc-.co.jp" and an e-mail address "ifaxa@abc.co.jp". Similarly, on a local area network LANb, workstations WSB1 through WSBn, a mail server MSB and a network facsimile device NFB are connected. The WSB1 through the WSBn have e-mail addresses "wsb1@xyz.co.jp" through "wsbn@xyz.co.jp". The MSB has a network address "msrvb1.xyz.co.jp". The NFB has a network address "ifaxb.xyz.co.jp" and an e-mail address "ifaxb@xyz.co.jp". Additionally, the LANa and the LANb are connected to the Internet respectively through a router RA and a router RB. Network terminal devices including the network facsimile devices NFA and NFB can send e-mail by SMTP (Simple-mail Transfer Protocol) or MIME (Multipurpose Internet Mail Extension) protocol on TCP/IP (Transmission Control Protocol/Internet Protocol).

Additionally, the network terminal devices on the LANa or the LANb can receive e-mail by accessing the mail server MSA or MSB by POP (Post Office Protocol) 3.

Additionally, the network facsimile devices NFA and NFB are connected to a public network such as PSTN (Public Switched Telephone Network) or ISDN (Integrated Services Digital Network), and can send and receive fax documents through the public network.

Figure 2:
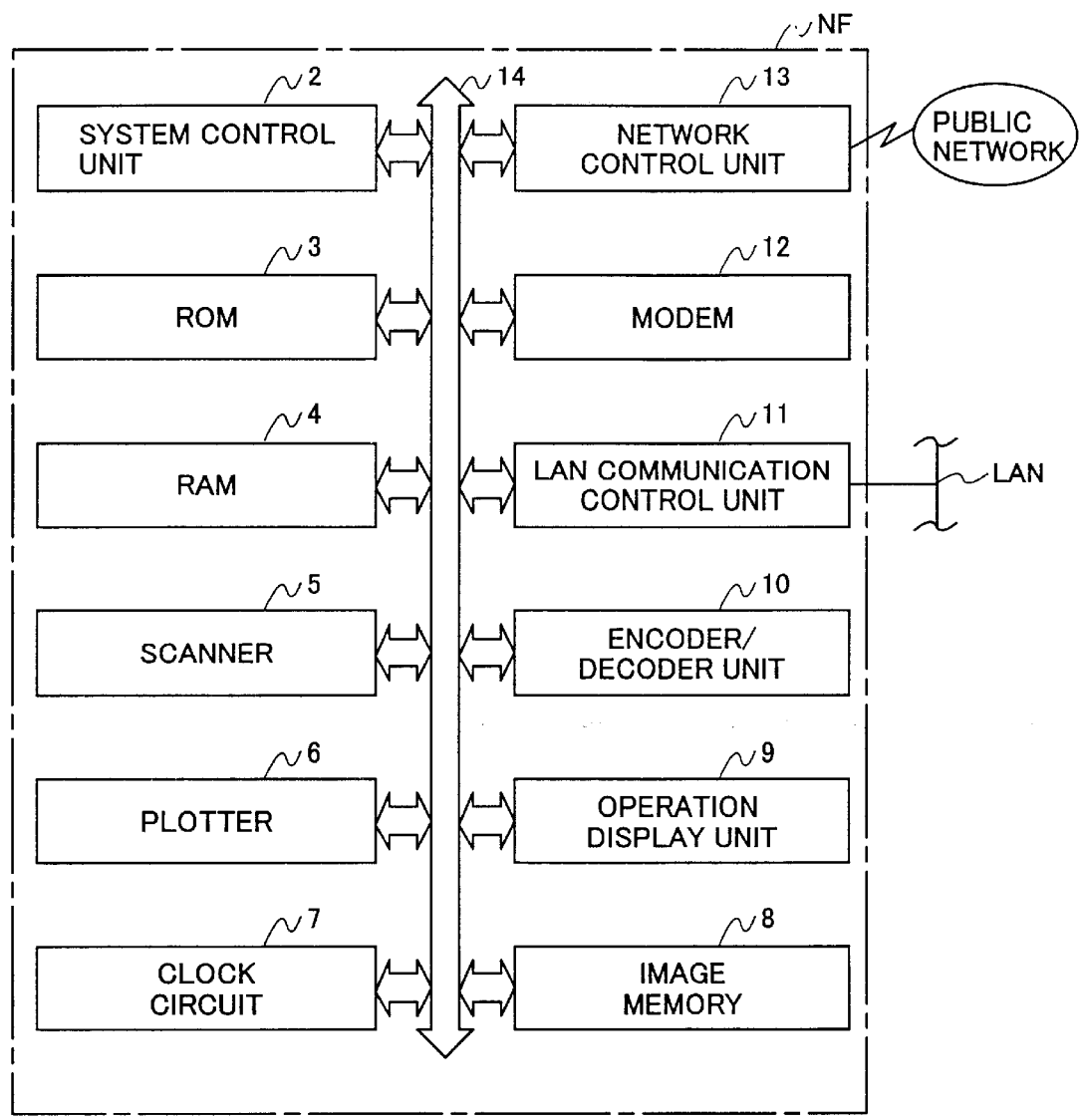
FIG. 2 is a block diagram showing components of the network facsimile device according to the first embodiment of the present invention.

FIG. 2 is a block diagram showing a structure of a network facsimile device NF that is identical to the network facsimile devices NFA and NFB.

In FIG. 2, the network facsimile device NF includes a system control unit 2, a ROM 3, a RAM 4, a scanner 5, a plotter 6, a clock circuit 7, an image memory 8, an operation display unit 9, an encoder/decoder unit 10, a LAN communication control unit 11, a modem 12, a network control unit 13, and a system bus 14.

The system control unit 2 is a microcomputer controlling each unit in the network facsimile device NF with use of the RAM 4 as a working area under the control of a control program stored in the ROM 3.

The ROM 3 is a read-only memory storing the control program for the system control unit 2 to control each above-described unit in the network facsimile device NF. The RAM 4 is a random access memory used by the system control unit 2 as the working area. Additionally, the contents of the RAM 4 are maintained even when the network facsimile device NF is powered off since a backup circuit not shown backs up the RAM 4.

The scanner 5 obtains image information by reading a document image with a fixed read-line density, for example, 3.85 lines/mm, 7.7 lines/mm or 15.4 lines/mm. The plotter 6 prints out and records the image information read by the scanner 5 or image information received through a network depending on the read-line density.

Besides checking a current time and a date, the clock circuit 7 operates as a timer counting down a fixed time that is set up by the system control unit 2, and notifies a timeout of the timer to the system control unit 2. The image memory 8 is a temporary storage area that temporarily stores the image information read by the scanner 5 as a file until the image information is memory-transmitted, and also stores the image information received through the network until the image information is recorded by the plotter 6.

The operation display unit 9 includes an indicator such as a liquid crystal indicator to display operating conditions of the network facsimile device NF or various messages to a user, and is provided with a ten-key pad, a start key, a one-touch dial key and various other keys. The ten-key pad is used for specifying a telephone number to call.

The encoder/decoder unit 10 encodes and compresses transmitting image data by a fixed encoding method for a G3 facsimile such as an MH encoding method, an MR encoding method, an MMR encoding method, or the like. The encoder/decoder unit 10 also decodes and expands received image data by a fixed decoding method corresponding to the MH encoding method, MR encoding method, MMR encoding method, or the like.

By controlling TCP/IP protocol on the LAN, the LAN communication control unit 11 enables the system control unit 2 to send and receive e-mail by each protocol SMTP, MIME and POP on TCP/IP. The modem 12 is a G3 facsimile modem modulating data that is transmitted through the network control unit 13 to the public network, and demodulating data that is received through the network control unit 13 from the public network. Additionally, the modem 12 sends out a DTMF signal corresponding to the other party's telephone number.

The network control unit 13 that is connected to a telephone line, controls the connection between the network facsimile device NF and the telephone line by detecting a line polarity turning over, a line opening, a dial tone, a tone signal such as a busy tone and a call signal, and by opening and closing a DC loop of the telephone line. Additionally, the network control unit 13 sends out a select signal corresponding to the other party's telephone number as a dial pulse signal matching a dial line of 20 PPS or 10 PPS. The system bus 14 is a signal line for each above-described part to exchange data with each other.

A description will now be given of a method to receive e-mail by the network facsimile device NF with reference to FIG. 3. In the first embodiment of the present invention, the network facsimile device NF is compatible to a mail delivery confirmation method (RFC2298) of MDN (Message Disposition Notification) that includes the steps of providing a "Disposition-Notification-to:" field in a mail header, describing a destination address of confirmation mail in the field, and requesting the mail delivery confirmation to be sent to the address.

In the first embodiment of the present invention, the description will be given for the following case. E-mail sent from the network facsimile device NFA by SMTP is transferred from the mail server MSA to the mail server MSB, and is stored in a mailbox for the network facsimile device NFB in the MSB. Subsequently, the NFB receives the e-mail by accessing the MSB by POP3 protocol.

Figure 3:
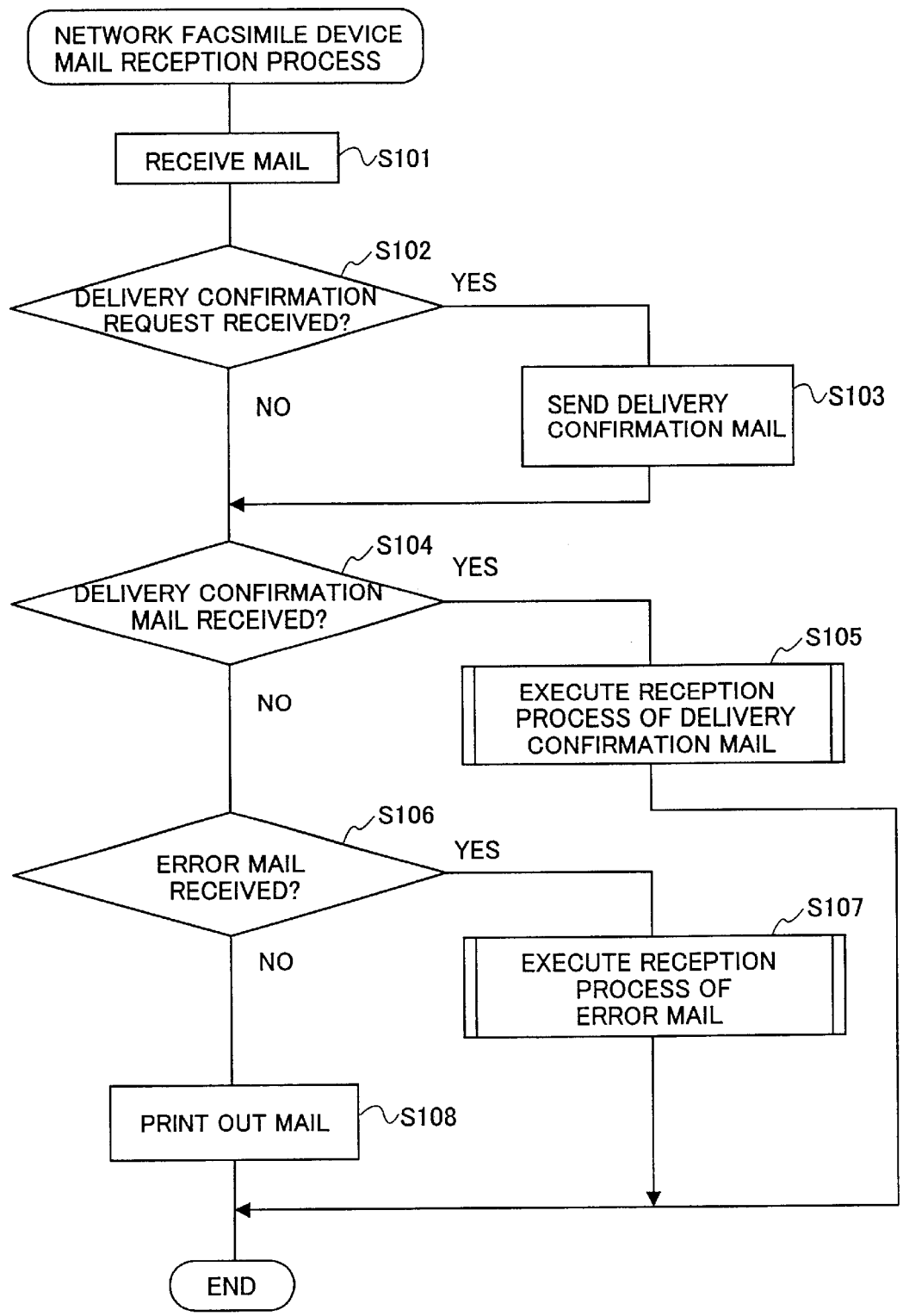
FIG. 3 is a flowchart showing steps of a mail reception process by the network facsimile device according to the first embodiment of the present invention.
Figure 4:
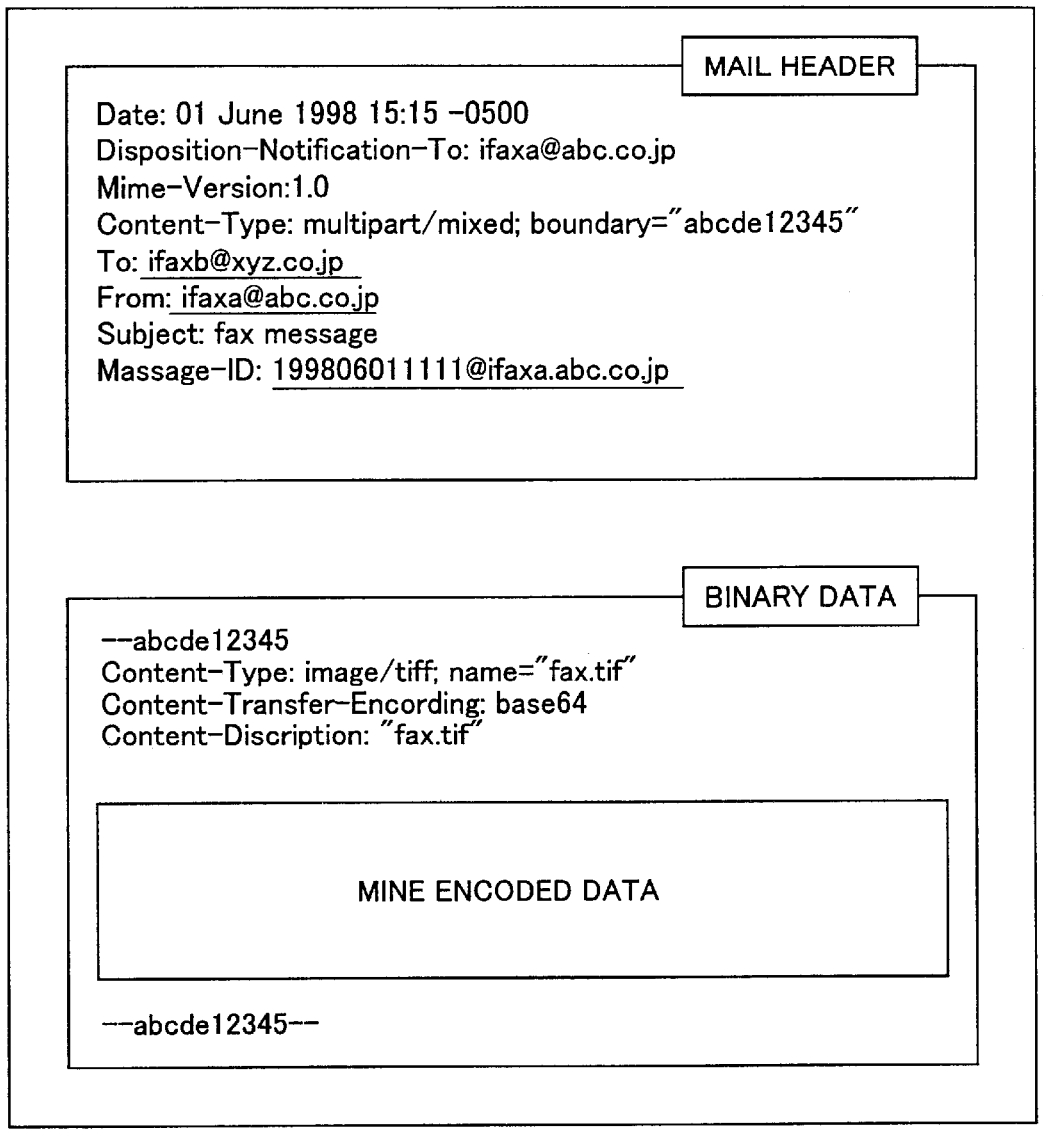
FIG. 4 is a diagram showing one form of contents of transmitted electronic mail.

In FIG. 3, the network facsimile device NFA or NFB receives mail by accessing respectively the mail server MSA or MSB at a step S101, and checks whether the received mail includes a delivery confirmation request at a step S102. In other words, the NFA or NFB checks whether the "Disposition-Notification-To:" field exists in its mail header as shown in FIG. 4. If it is ascertained at the step S102 that there is the delivery confirmation request in the received mail, at a step S103, the NFA or the NFB sends delivery confirmation mail as shown in FIG. 5 to the mail address notified in the "Disposition-Notification-To:" field, in this case, "ifaxa@abc.co.jp".

Figure 5:
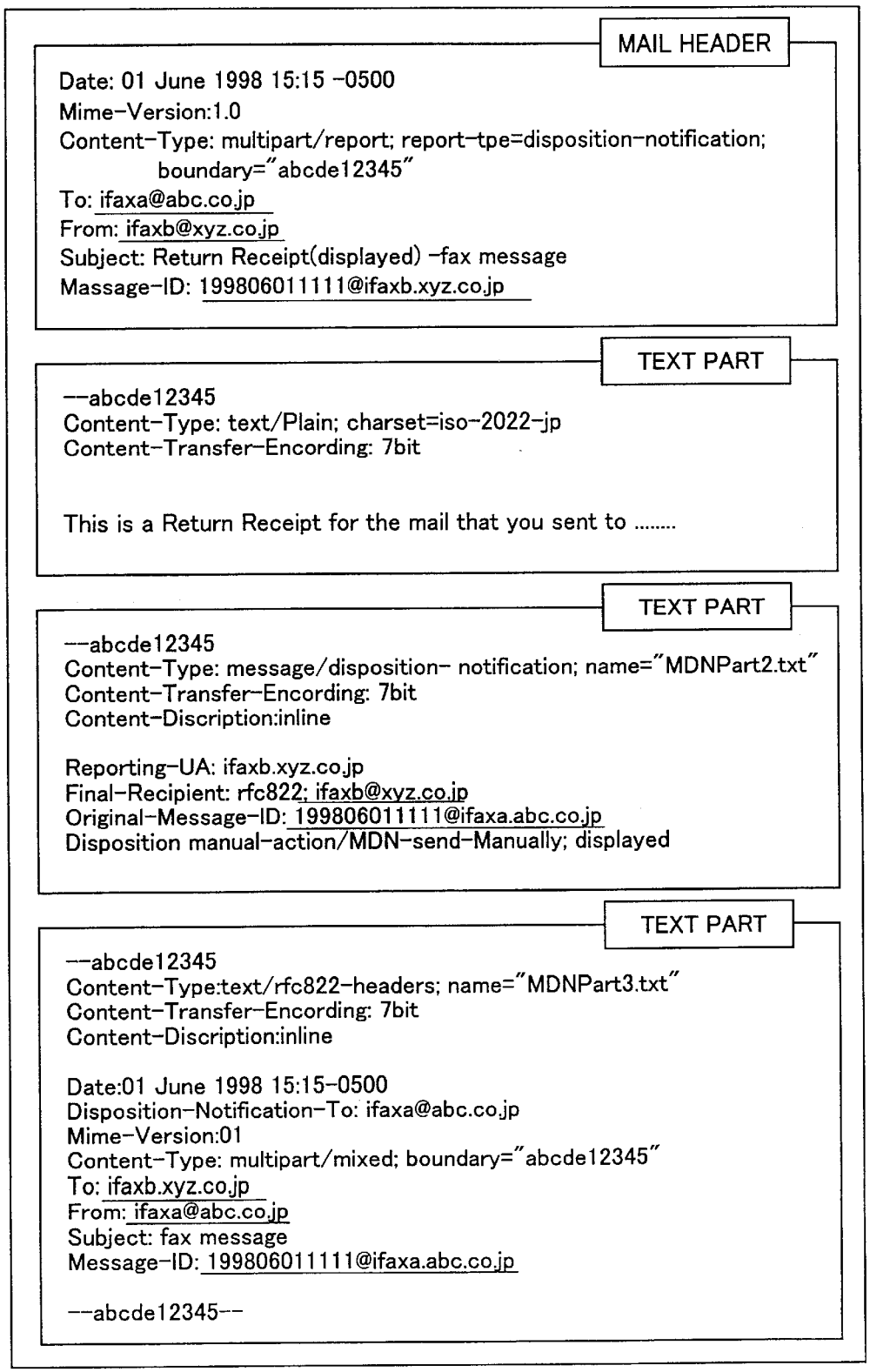
FIG. 5 is a diagram showing one form of contents of delivery confirmation mail.

If it is ascertained at the step S102 that the delivery confirmation request is not in the received mail, at a step S104, the NFA or the NFB checks whether the received mail is the delivery confirmation mail as shown in FIG. 5. If it is ascertained at the step S104 that the received mail is the delivery confirmation mail, the NFA or the NFB executes a reception process of the delivery confirmation mail at a step S105, and terminates the process. A concrete description of the reception process of the delivery confirmation mail will be provided later.

Figure 6:
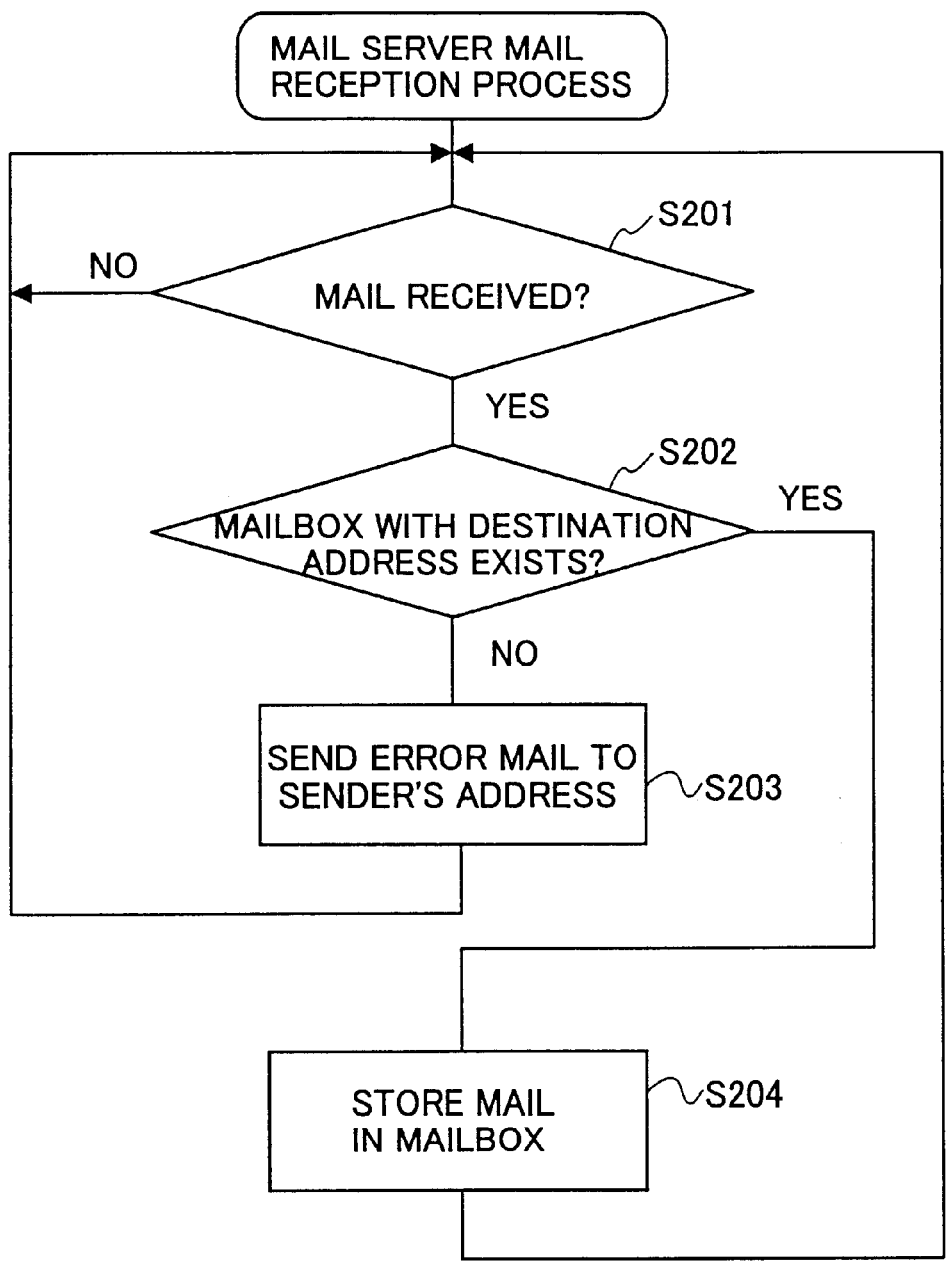
FIG. 6 is a flowchart showing steps of a mail reception process by a mail server.

If it is ascertained at the step S104 that the received mail is not the delivery confirmation mail, at a step S106, the NFA or the NFB checks whether the received mail is error mail with a fixed format sent by the mail server MSA or MSB at a step S203 shown in FIG. 6, showing that a destination address is unknown and thus the mail cannot to be sent to the address. If it is determined at the step S106 that the received mail is the error mail, the NFA or the NFB executes a reception process of the error mail at a step S107, and terminates the process. A concrete description of the reception process of the error mail will be provided later.

If the received mail is a regular mail or a mail with a delivery confirmation request and is neither the delivery confirmation mail nor the error mail, the NFA or the NFB prints out and thus records the mail on paper by using the plotter 6 at a step S108.

The network facsimile NFA or NFB processes the regular mail normally by printing on the paper. However, since the delivery confirmation mail and the error mail simply indicate whether the mail sent by the NFA or the NFB was correctly received by a receiver, the NFA or the NFB processes the delivery confirmation mail and the error mail respectively by the reception process of the delivery confirmation mail at the step S105 and the reception process of the error mail at the step S107 for not only saving paper but also managing results of mail deliveries together.

When mail is sent from the network facsimile device NFA to the network facsimile device NFB, only the NFB can select the step S103 at the step S102. In addition, only the NFA can select the step S105 at the step S104, and the step S107 at the step S106.

A description will now be given of a process to receive-mail by the mail server MSB with reference to FIG. 6.

As shown is FIG. 6, the mail server MSB checks whether mail is delivered from the mail server MSA or the like at a step S201. If the MSB receives the mail from the MSA or the like, the MSB checks whether a mailbox with an address specified in a "To:" field of the received mail exists in the MSB at a step S202. If the mailbox with the address exists in the MSB, the MSB stores the received mail in the mailbox at a step S204, and returns to the step S201.

For instance at the step S202, the address "wsa1@abc.co.jp" is set instead of the correct address "ifaxb@xyz.co.jp" when setting the destination address by the network facsimile device NFA. The mail server MSB ascertains that there is no mailbox with the address "wsa1@abc.co.jp" in the MSB, and proceeds to a step S203. At the step S203, the MSB sends the error mail with the fixed format to the address specified in a "From:" field of the received mail. The mail sent at the step S203 by the MSB is received at the step S101 in FIG. 3, and is detected at the step S106 by the NFA. The fixed format of the error mail can be such as fixed characters in a "Subject:" field of the error mail header or fixed characters in a text part of the error mail.

A description will now be given of a first embodiment of a mail transmitting process by the network facsimile device NFA with reference to FIG. 7.

The network facsimile device NFA initially checks whether a document is set in the scanner 5 at a step S301. If the document is set in the scanner 5, the NFA subsequently checks through the operation display unit 9 whether the destination address is specified at a step S302. If it is ascertained at the step S302 that the destination address is specified, the NFA additionally checks through the operation display unit 9 whether an instruction to send the mail is inputted to the NFA at a step S303. If it is ascertained at the step S303 that the instruction to send the mail is inputted, the NFA proceeds to a step S304, where the NFA reads the document with use of the scanner 5 and creates image information. Subsequently, the NFA creates mail encoded by MIME from the obtained image information at a step S305, and sends the mail to the mail server MSA by connecting thereto by SMTP protocol at a step S306. The e-mail created at the step S305 and sent at the step S306 matches the mail delivery confirmation method (RFC2298) of MDN (Message Disposition Notification) that includes the steps of providing a "Disposition-Notification-to:" field in the mail header as shown in FIG. 4, describing the destination address of the confirmation mail in the field, and requesting the mail delivery confirmation to be sent to a specified address. In this case, the specified address in the "Disposition-Notification-to:" field is the address of the NFA "ifaxa@abc.co.jp".

Additionally, at a step S307, the NFA records communication management information that is obtained when the mail is sent in the step S306, in a communication management table 4a stored in the RAM 4 of the NFA as shown in FIG. 8.

In FIG. 8, the communication management table 4a includes the communication management information corresponding to each record number. For instance, the communication management information of a record number 01 is that of the step S307 in FIG. 7.

The communication management information includes a "send/receive" field, "date" and "time" fields, an "address" field, a "mode" field, a "communication time" field, a "page" field, a "result" field and a "file number" field. The "send/receive" field indicates that a communication by the NFA is either "send" or "receive". The "date" and "time" fields show respectively the date and the time that are read from the clock circuit 7 when the communication by the NFA starts. The communication by the NFA includes facsimile communication through the public network and e-mail communication through the network. The "address" field shows the address to communicate with. The "mode" field indicates either the G3 facsimile communication through the public network or the e-mail communication through the network. The "communication time" field shows duration of the communication time. The "page" field shows the number of the image information pages communicated. The "result" field indicates whether the communication has succeeded (OK), has failed (ERR), or is unknown "--". Finally, the "file number" field shows a consecutive number for each communication.

The communication management information at the record number 01 has "--" in the "result" field since the NFA sent the mail at the step S307 and has not received the delivery confirmation mail or the error mail from the NFB yet. However, the communication management information at the record number 02 has "OK" in the "result" field in FIG. 8. Since the communication management information at the record number 02 is the information for the G3 facsimile communication through the public network so that the NFA communicates directly with the other device NFB, the "result" field can only be either "OK" or "ERR".

The network facsimile device NFA has an ability to output the communication management information in the form of a communication management report. Any time a fixed operation instructing the NFA to print out the communication management report is inputted through the operation display unit 9 to the NFA, the NFA creates the communication management report based on the recorded contents of the communication management table 4a, and outputs the report visibly by printing the report onto paper with use of the plotter 6. The created communication management report can be displayed on a monitor or an indicator not shown in the figures of the operation display unit 9 instead of being printed on the paper. Additionally, the NFA can be designed to create and print out the communication management report automatically for each fixed number of communications, for example, 50, and to delete the previously created and outputted communication management report in the RAM 4.

FIG. 9 shows the communication management report created and outputted based on the recorded contents of the communication management table 4a shown in FIG. 8. The communication management information at the record number 01 includes "--" for the "result" field and "0001" for the "file number" field. The "result" field is still unknown at the step S307 in FIG. 7.

Figure 7:
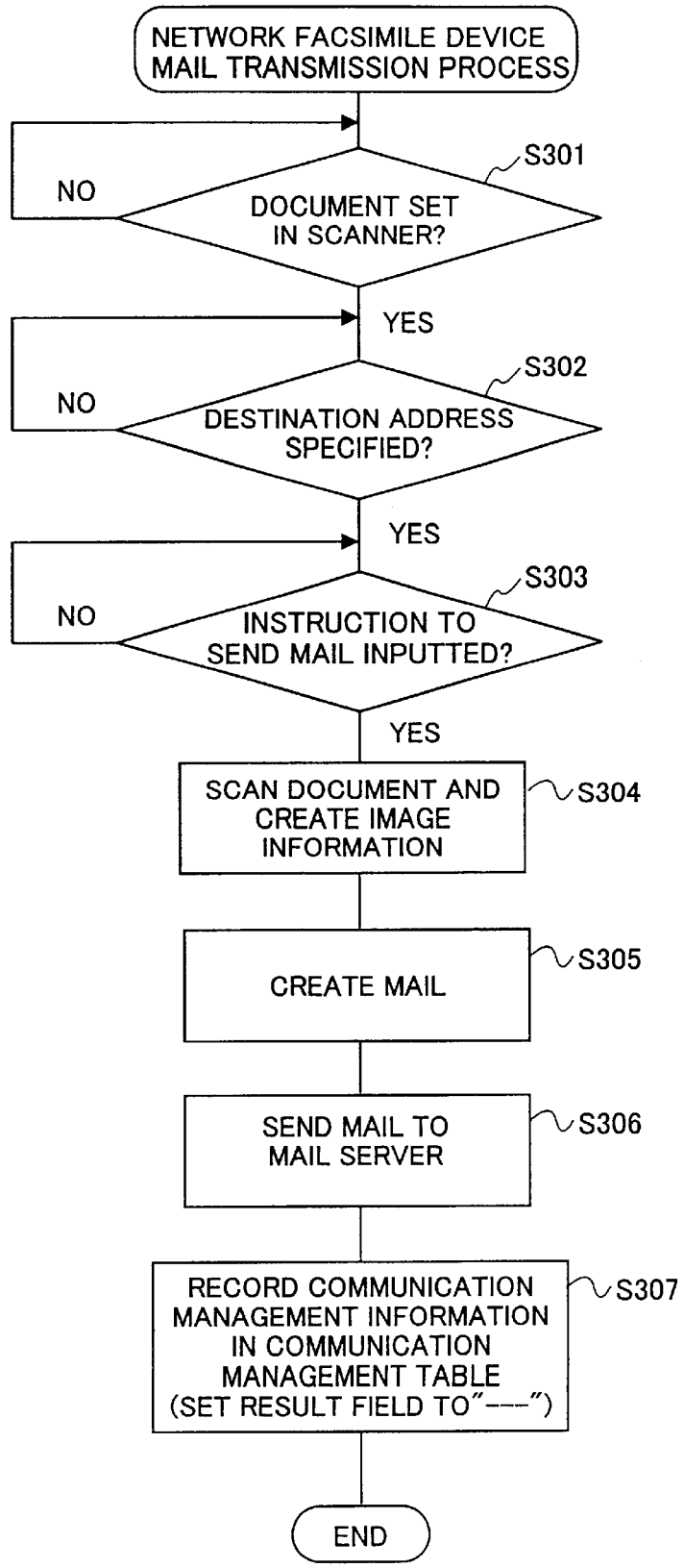
FIG. 7 is a flowchart showing a first embodiment of steps of a mail transmission process by the network facsimile device according to the first embodiment of the present invention.

After the network facsimile device NFA sends e-mail with the delivery confirmation request in the mail transmitting process as shown in FIG. 7, the network facsimile device NFB returns the delivery confirmation mail as shown in FIG. 5 to the NFA by detecting the delivery confirmation request from the NFA at the step S102 in FIG. 3 and subsequently by sending out the delivery confirmation mail to the NFA at the step S103.

The NFA detects the delivery confirmation mail sent from the NFB at the step S104 in FIG. 3, and executes the reception process of the delivery confirmation mail at the step S105.

A description will now be given of a first embodiment of the reception process of the delivery confirmation mail at the step S105 in FIG. 3 with reference to FIG. 10, corresponding to the first embodiment of the mail transmitting process shown in FIG. 7.

Figure 10:
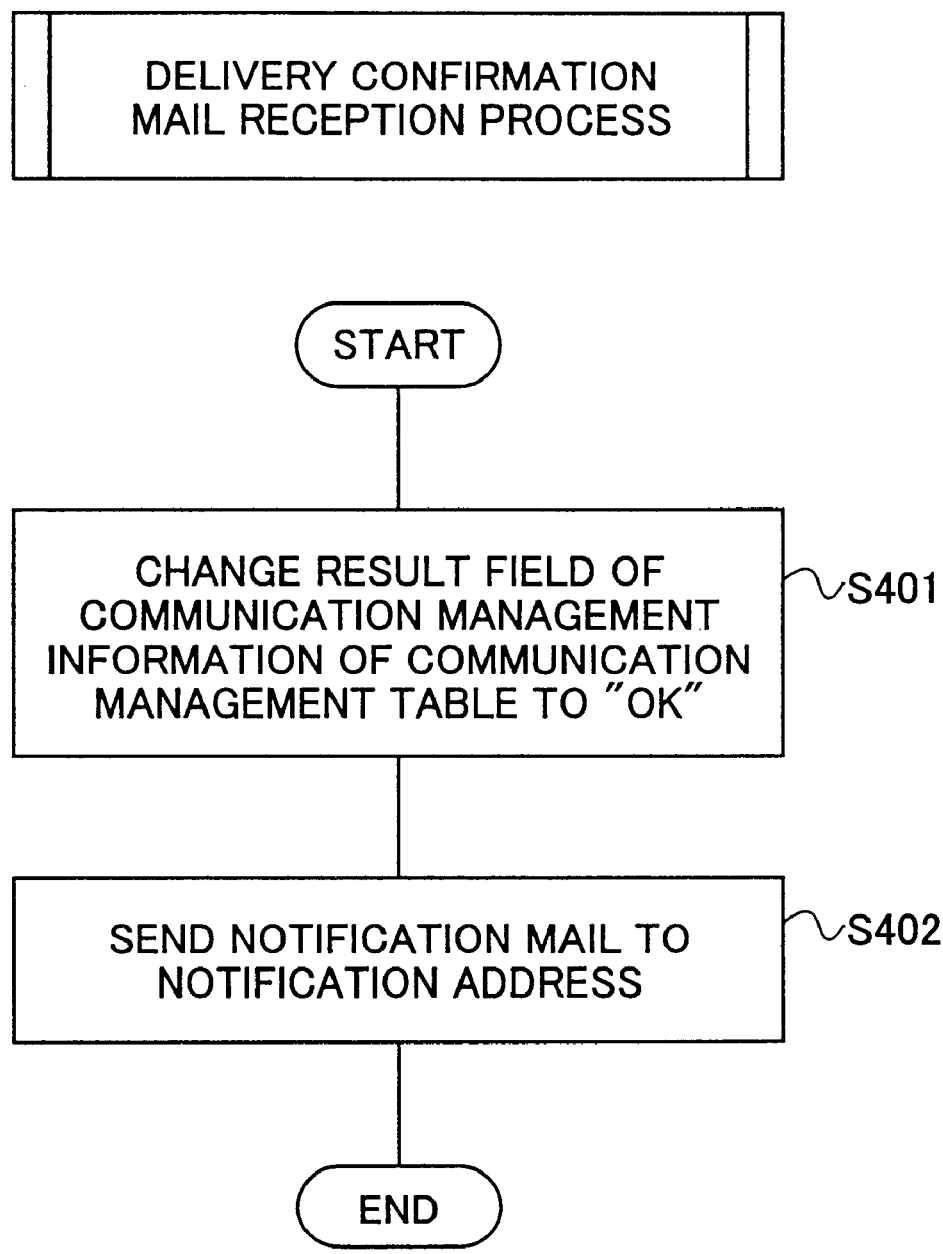
FIG. 10 is a flowchart showing a first embodiment of a reception process of the delivery confirmation mail.

At a step S401 shown in FIG. 10, the network facsimile device NFA changes "--" to "OK" in the "result" field of the communication management information recorded in the communication management table 4a at the step S307 shown in FIG. 7, indicating that the mail has been delivered to the NFB correctly.

FIG. 11 shows the communication management table 4a with "OK" in the "result" field, whereas FIG. 8 shows the communication management table 4a with the unknown sign "--" in the "result" field.

Additionally, FIG. 12 shows the communication management report created and outputted based on the recorded contents of the communication management table 4a shown in FIG. 11. The "result" field is changed from "--" to "OK" indicating that the mail with the file number "0001" has been delivered to the NFB correctly.

Figure 13:
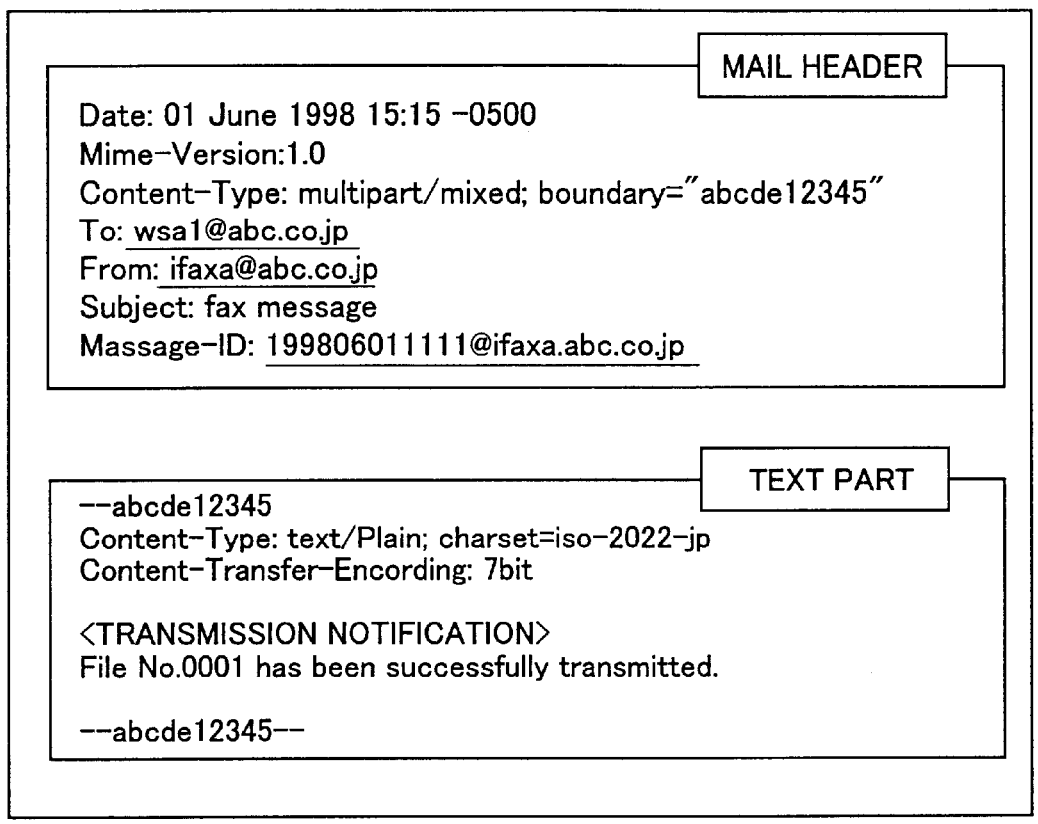
FIG. 13 is a diagram showing a first form of notification mail.
Figure 14:
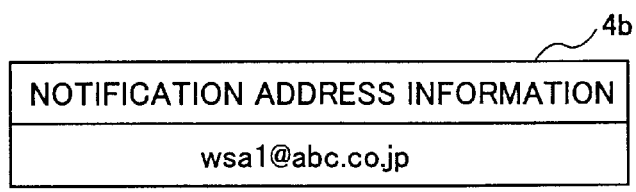
FIG. 14 is a diagram showing notification address information.

In FIG. 10, the single step S401 may be processed as the first embodiment of the reception process of the delivery confirmation mail. However, a step S402 can be added after the step S401. The step S402 sends mail notifying of the reception of the delivery confirmation mail, or notification mail, as shown in FIG. 13 to a notification address. In the above-described case, the notification address is initially stored in the RAM 4 as notification address information 4b as shown in FIG. 14. In FIG. 14, the notification address is set to the mail address "wsa1@abc.co.jp" of the workstation WSA1, and the notification mail shown in FIG. 13 is sent to the workstation WSA1 at the step S402 in FIG. 10. Accordingly, a person in charge of managing the network facsimile device NFA can control results of mail deliveries performed by the NFA at once.

A description will now be given of a first embodiment of the reception process of the error mail at the step S107 in FIG. 3 with reference to FIG. 15. The reception process of the error mail is performed when the error mail is detected at the step S106 in FIG. 3.

Figure 15:
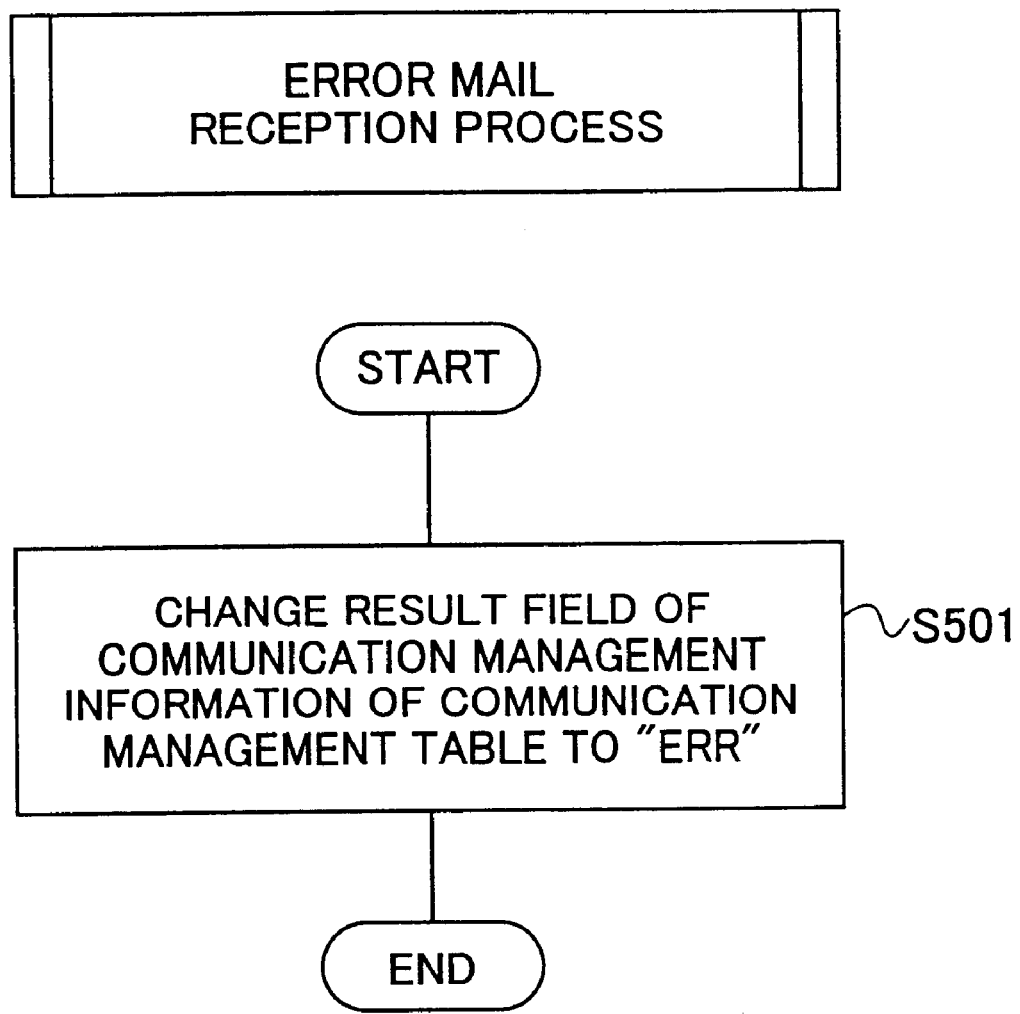
FIG. 15 is a flowchart showing a first embodiment of a reception process of the error mail.

At a step S501 in FIG. 15, the network facsimile device NFA changes the "result" field of the communication management information that is recorded in the communication management table 4a by the step S307 in FIG. 7, from the unknown sign "--" to the error "ERR" indicating that the mail delivery has failed.

FIG. 16 shows the communication management table 4a with "ERR" in the "result" field, whereas FIG. 8 shows the communication management table 4a with the unknown sign "--" in the "result" field.

Additionally, FIG. 17 shows the communication management report created and outputted based on the recorded contents of the communication management table 4a shown in FIG. 16. The "result" field is changed from "--" to "ERR" indicating that the mail with the file number "0001" was not delivered to the NFB correctly.

Figure 18:
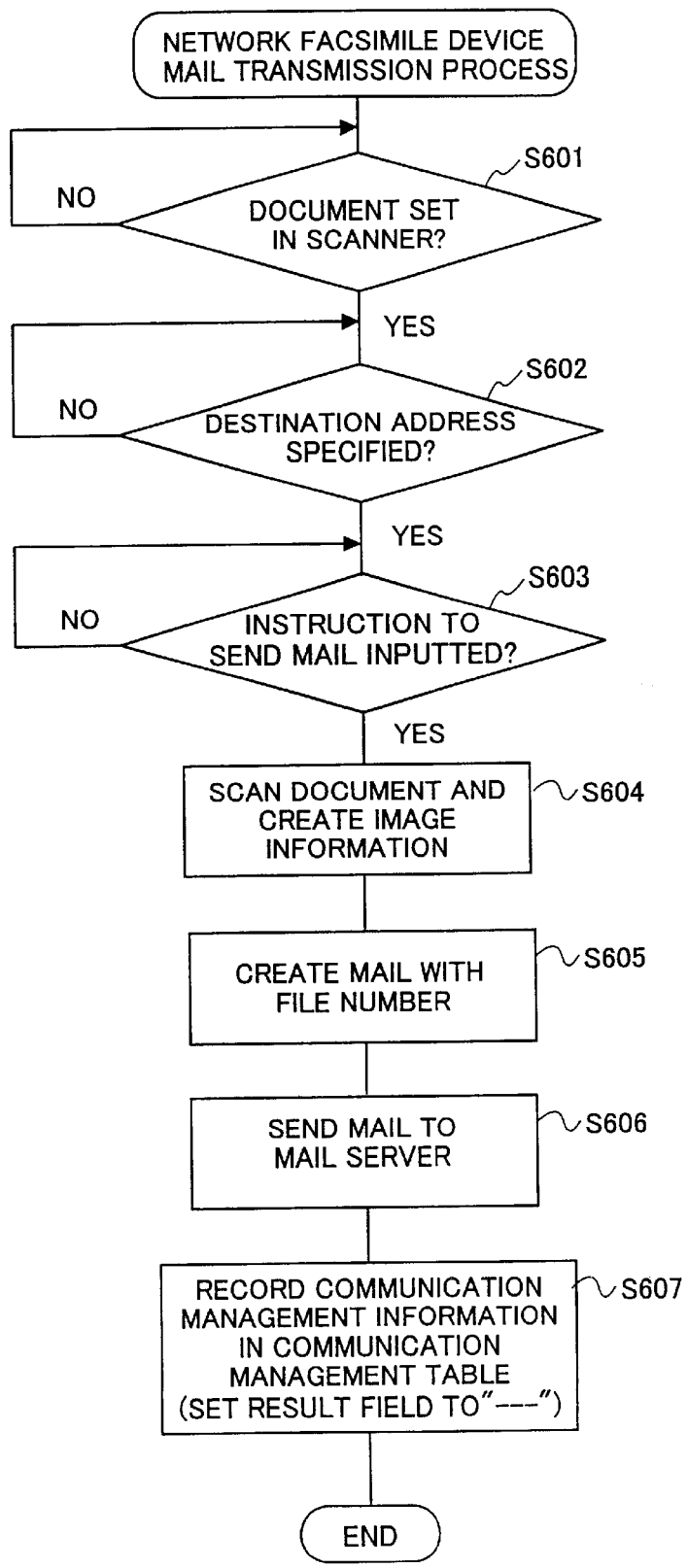
FIG. 18 is a flowchart showing a second embodiment of steps of the mail transmission process by the network facsimile device according to the first embodiment of the present invention.
Figure 19:
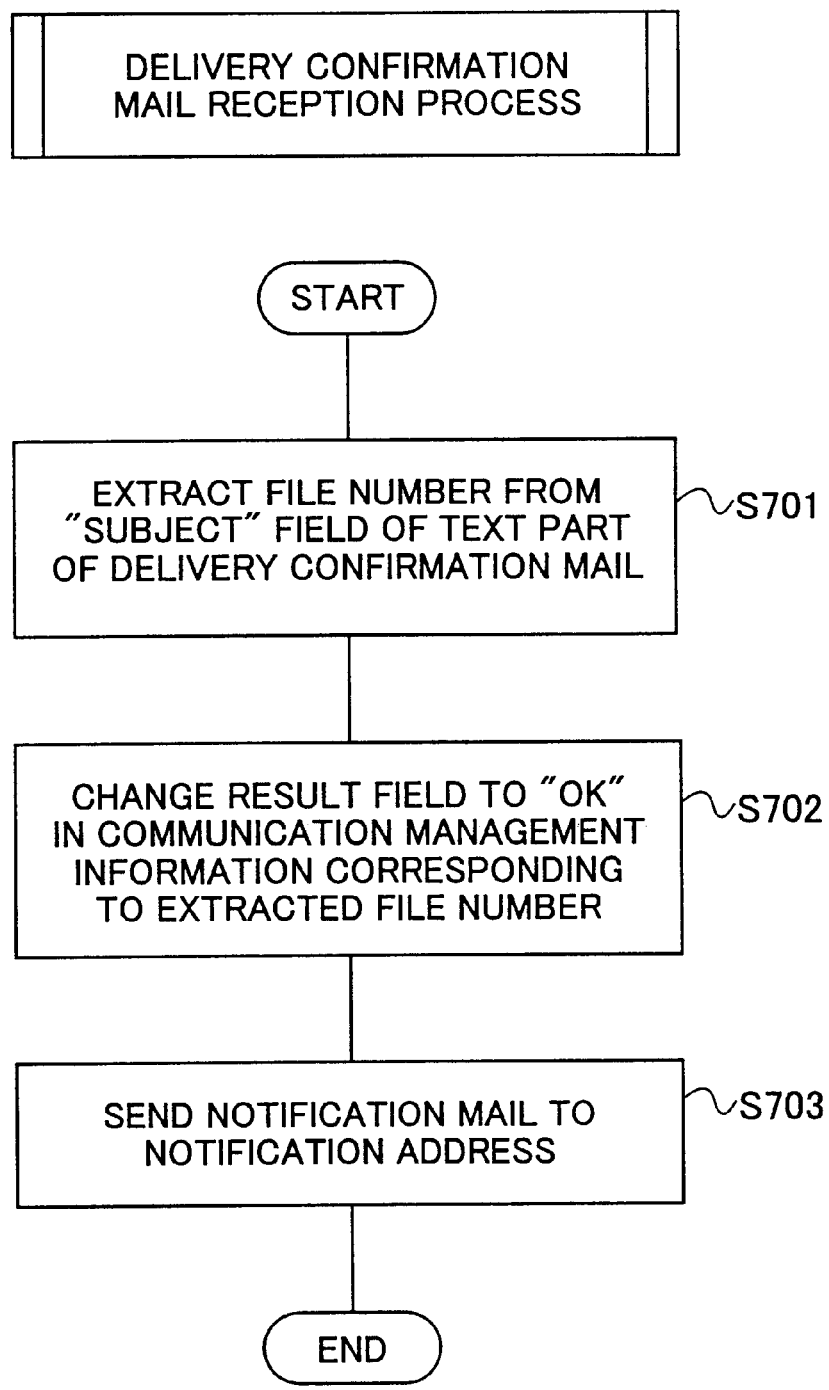
FIG. 19 is a flowchart showing a second embodiment of the reception process of the delivery confirmation mail.
Figure 20:
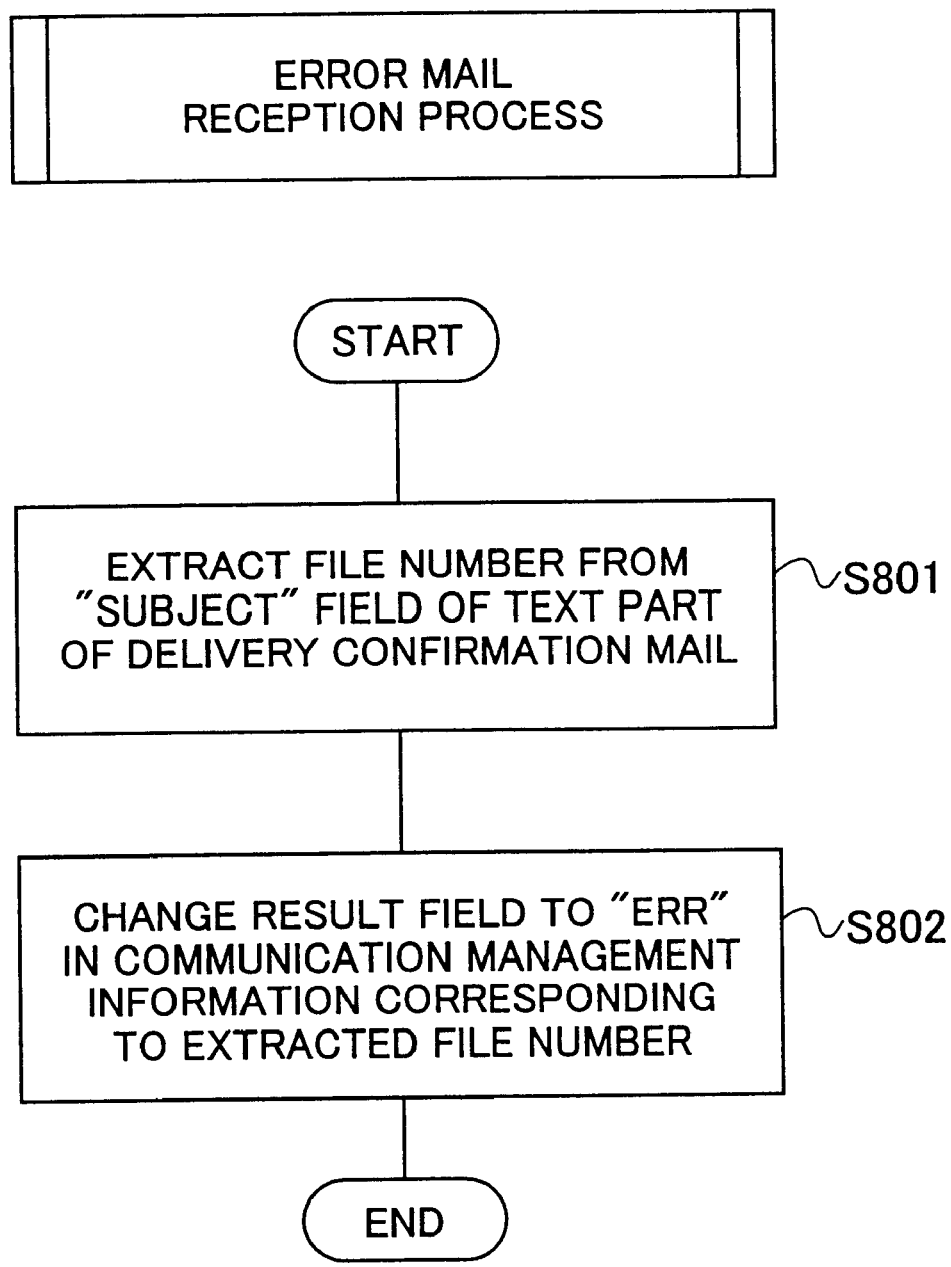
FIG. 20 is a flowchart showing a second embodiment of the reception process of the error mail.

A second embodiment of the mail transmitting process shown in FIG. 18, a second embodiment of the reception process of delivery confirmation mail shown in FIG. 19 and a second embodiment of the reception process of error mail shown in FIG. 20 can be substituted respectively for the first embodiment of the mail transmitting process shown in FIG. 7, the first embodiment of the reception process of the delivery confirmation mail shown in FIG. 10 and the first embodiment of the reception process of the error mail shown in FIG. 15.

In the second embodiment of the mail transmitting process as shown in FIG. 18, the network facsimile device NFA initially checks whether a document is set in the scanner 5 at a step S601. If the document is set in the scanner 5, the NFA subsequently checks through the operation display unit 9 whether the destination address is specified at a step S602. If it is ascertained at the step S602 that the destination address is specified, the NFA additionally checks through the operation display unit 9 whether an instruction to send the mail is inputted to the NFA at a step S603. If it is ascertained at the step S603 that the instruction to send the mail is inputted, the NFA proceeds to a step S604, where the NFA reads the document with use of the scanner 5 and creates image information. Subsequently, at a step S605, the NFA creates mail encoded by MIME from the obtained image information, and adds a file number to the created mail, for example, in the "Subject:" field of the mail header in a fixed format such as "Subject: fax message (FILE=0001)". The file number described above is equal to the file number recorded in the "file number" field of the communication management information, and in this case, the file number is "0001".

At a step S606, the NFA sends the created mail with the file number to the mail server MSA by connecting thereto by SMTP protocol. The e-mail created at the step S605 and sent at the step S606 matches the mail delivery confirmation method (RFC2298) of MDN (Message Disposition Notification) that includes the steps of providing the "Disposition-Notification-to:" field in the mail header, describing the destination address of the confirmation mail in the field, and requesting the mail delivery confirmation to be sent to a specified address. In this case, the specified address in the "Disposition-Notification-to:" field is the address of the NFA "ifaxa@abc.co.jp".

Additionally, at a step S607, the NFA records the communication management information that is obtained when the step S606 sends the mail, in the communication management table 4a stored in the RAM 4 of the NFA. At this moment, the "result" field of the communication management information is set to unknown "--" as shown in FIG. 8.

After the network facsimile device NFA sends e-mail with the delivery confirmation request in the mail transmitting process as shown in FIG. 18, the network facsimile device NFB returns the delivery confirmation mail as shown in FIG. 5 to the NFA by detecting the delivery confirmation request from the NFA at the step S102 in FIG. 3 and subsequently by sending out the delivery confirmation mail to the NFA at the step S103.

The NFA detects the delivery confirmation mail sent from the NFB at the step S104 in FIG. 3, and executes the reception process of the delivery confirmation mail at the step S105.

A description will now be given of the second embodiment of the reception process of the delivery confirmation mail at the step S105 in FIG. 3 with reference to FIG. 19, corresponding to the second embodiment of the mail transmitting process shown in FIG. 18.

At a step S701 in FIG. 19, the network facsimile device NFA extracts the file number, in this case, "0001", from the "Subject:" field of the mail header in the mail sent by the NFA that is located in the text part of the received delivery confirmation mail shown in FIG. 5. For the second embodiment of the reception process of the delivery confirmation mail, the e-mail sent by the NFA is previously processed through the step S605 and the step S606 in FIG. 18.

At a step S702 in FIG. 19, as shown in FIG. 11, the NFA changes "--" to "OK" in the "result" field of the communication management information corresponding to the file number extracted at the step S701, indicating that the mail has been delivered to the NFB correctly.

Additionally, at a step S703, the NFA sends mail notifying of the reception of the delivery confirmation mail, or notification mail, as shown in FIG. 13 to the notification address that is initially stored in the RAM 4 as the notification address information 4b shown in FIG. 14.

As described above, the NFA adds the file number, which is information for distinguishing between the communication of the mail delivery and other communications, when sending the mail with the delivery confirmation request, and subsequently receives the file number as a content of the delivery confirmation mail. Accordingly, the NFA can specify the mail delivery according to the file number in the received delivery confirmation mail. Thus, in a case that the NFA sends a plurality of mail with delivery confirmation requests in a short amount of time, it is possible to distinguish each mail delivery easily and correctly by the file number attached to each mail, so as to increase accuracy of the communication management of mail deliveries.

A description will now be given of the second embodiment of the reception process of the error mail at the step S107 in FIG. 3 with reference to FIG. 20. The reception process of the error mail is performed when the error mail is detected at the step S106 in FIG. 3.

At a step S801 in FIG. 20, the network facsimile device NFA extracts the file number, in this case, "0001", from the "Subject:" field of the mail header in the mail sent by the NFA that is located in the text part of the received delivery confirmation mail shown in FIG. 5. For the second embodiment of the reception process of the error mail, the e-mail sent by the NFA is previously processed through the step S605 and the step S606 in FIG. 18.

At a step S802 in FIG. 20, as shown in FIG. 16, the NFA changes "--" to "ERR" in the "result" field of the communication management information corresponding to the file number extracted at the step S801, indicating that the mail delivery has failed.

As described above, the NFA adds the file number, which is information for distinguishing between the communication of the mail delivery and other communications, when sending the mail with the delivery confirmation request, and subsequently receives the file number as a content of the error mail. Accordingly, the NFA can specify the mail delivery corresponding to the received error mail. Thus, in a case that the NFA sends a plurality of mail with delivery confirmation requests in a short amount of time, it is possible to distinguish each mail delivery easily and correctly by the file number attached to each mail, so as to increase accuracy of the communication management of mail deliveries. The example of storing the file number in the "Subject:" field is described above. A method of storing the file number in a "Message-ID:" field is also applicable instead. In this case, the NFA receives the delivery confirmation mail shown in FIG. 5 with the file number in an "Original-Message-ID:" field of the second text part thereof.

Figure 21:
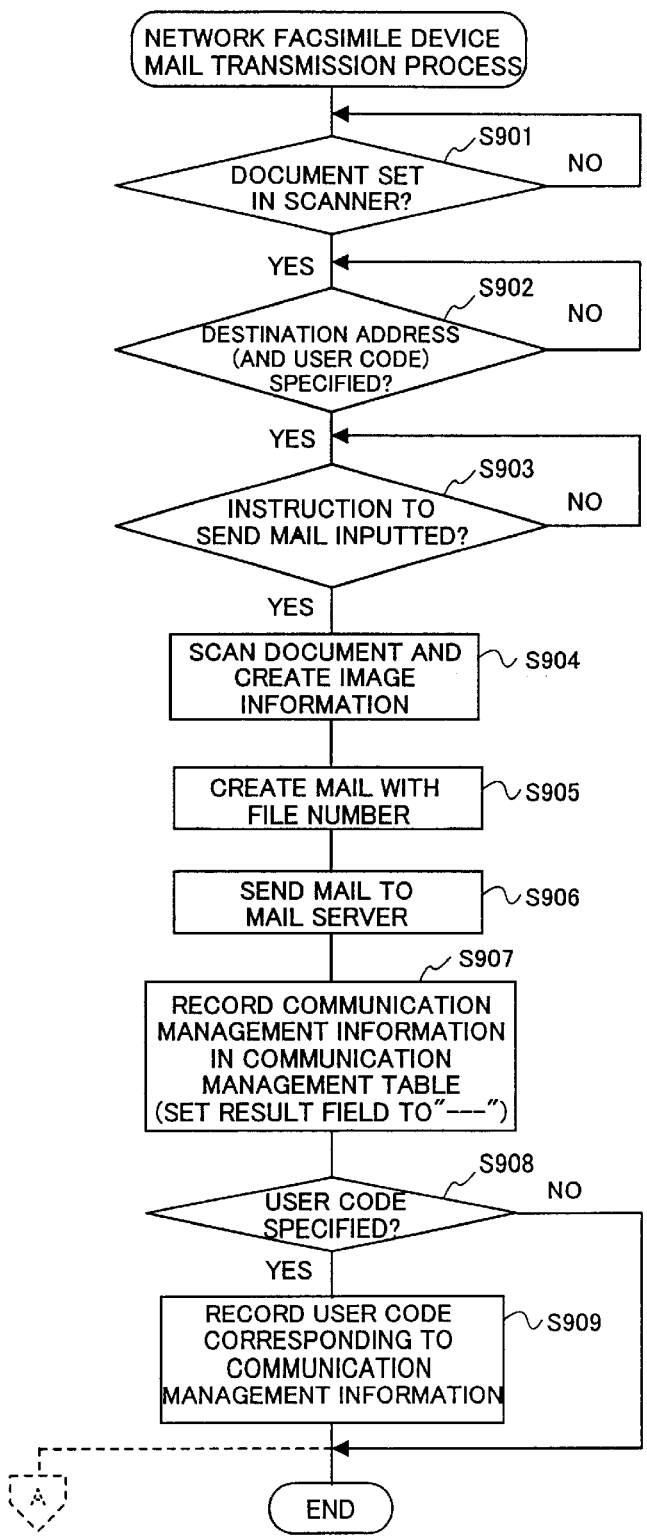
FIG. 21 is a flowchart showing a third embodiment of steps of the mail transmission process by the network facsimile device according to the first embodiment of the present invention.
Figure 22:
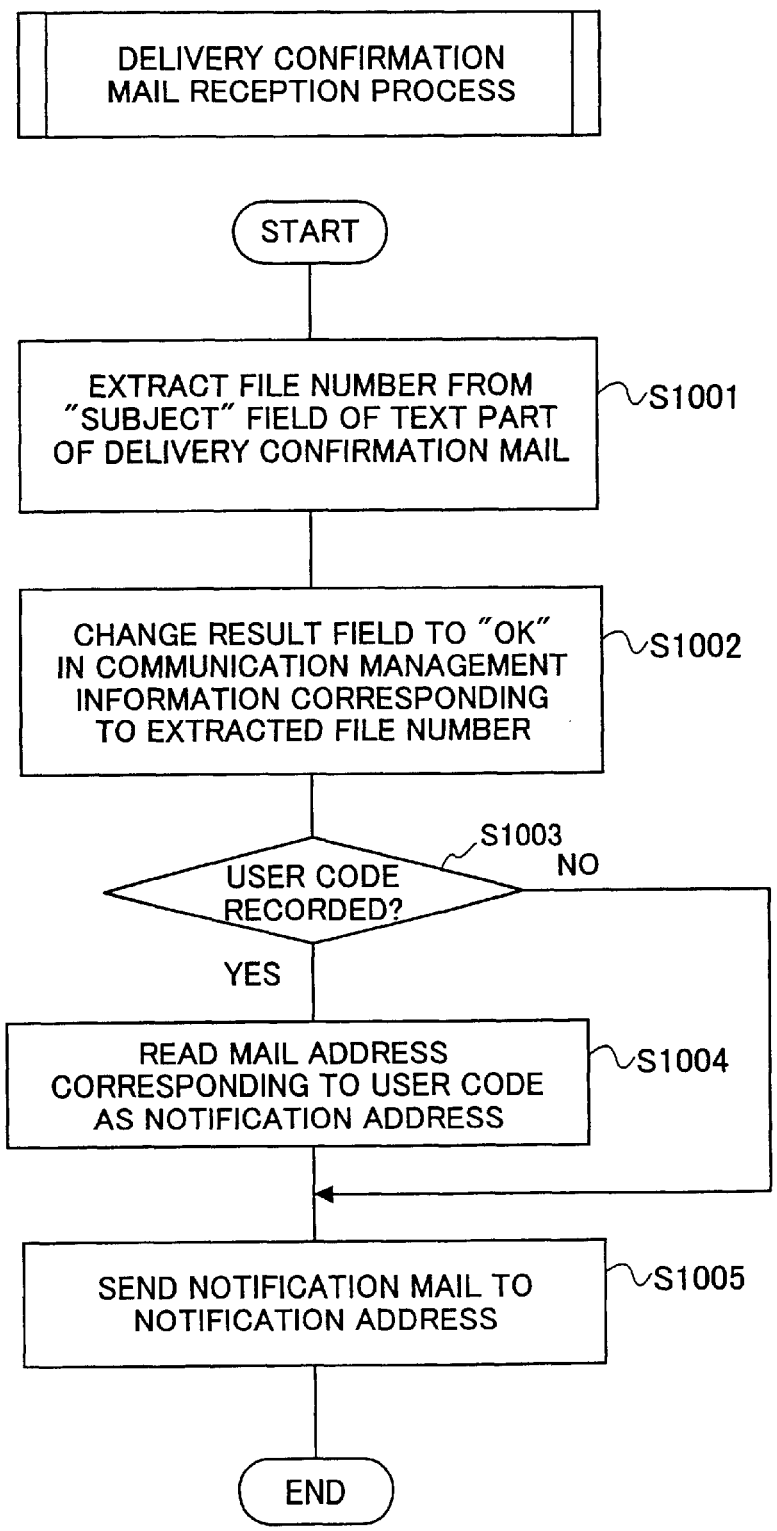
FIG. 22 is a flowchart showing a third embodiment of the reception process of the delivery confirmation mail.

A third embodiment of the mail transmitting process shown in FIG. 21, and a third embodiment of the reception process of delivery confirmation mail shown in FIG. 22 can be substituted respectively for the second embodiment of the mail transmitting process shown in FIG. 18, and the second embodiment of the reception process of the delivery confirmation mail shown in FIG. 19.

Preceding the process of the above-mentioned third embodiment, a user code-mail address conversion table 4c as shown in FIG. 23 must be stored in the RAM 4 of the network facsimile device NFA. A user code is provided for each user of the NFA in order to distinguish the user. A mail address is registered for each user corresponding to the user code.

In the third embodiment of the mail transmitting process as shown in FIG. 21, the network facsimile device NFA initially checks whether a document is set in the scanner 5 at a step S901. If the document is set in the scanner 5, the NFA subsequently checks through the operation display unit 9 whether the destination address is specified at a step S902. In the third embodiment, the NFA also checks whether the user code is specified at the same time as the step S902 if necessary.

If it is ascertained at the step S902 that the destination address (and the user code) is specified, the NFA additionally checks through the operation display unit 9 whether an instruction to send the mail is inputted to the NFA at a step S903. If it is ascertained at the step S903 that the instruction to send the mail is inputted, the NFA proceeds to a step S904, where the NFA reads the document with use of the scanner 5 and creates image information. Subsequently, at a step S905, the NFA creates mail encoded by MIME from the obtained image information, and adds a file number to the created mail, for example, in the "Subject:" field of the mail header in a fixed format such as "Subject: fax message (FILE=0001)". The file number described above is equal to the file number recorded in the "file number" field of the communication management information, and in this case, the file number is "0001".

At a step S906, the NFA sends the created mail with the file number to the mail server MSA by connecting thereto by SMTP protocol. The e-mail created at the step S905 and sent at the step S906 matches the mail delivery confirmation method (RFC2298) of MDN (Message Disposition Notification) that includes the steps of providing the "Disposition-Notification-to:" field in the mail header, describing the destination address of the confirmation mail in the field, and requesting the mail delivery confirmation to be sent to a specified address. In this case, the specified address in the "Disposition-Notification-to:" field is the address of the NFA "ifaxa@abc.co.jp".

Additionally, at a step S907, the NFA records the communication management information that is obtained when the step S906 sends the mail, in the communication management table 4a stored in the RAM 4 of the NFA. At this moment, the "result" field of the communication management information is set to unknown "--" as shown in FIG. 8.

Additionally, at a step S908, the NFA checks whether the user code was specified at the step S902. If it is ascertained at the step S908 that no user code was specified, the NFA terminates the mail transmitting process. If it is ascertained that the user-code was specified, at a step S909, the NFA records the user code corresponding to the communication management information recorded at the step S907.

After the network facsimile device NFA sends e-mail with the delivery confirmation request in the mail transmitting process as shown in FIG. 21, the network facsimile device NFB returns the delivery confirmation mail as shown in FIG. 5 to the NFA by detecting the delivery confirmation request from the NFA at the step S102 in FIG. 3 and subsequently by sending out the delivery confirmation mail to the NFA at the step S103.

The NFA detects the delivery confirmation mail sent from the NFB at the step S104 in FIG. 3, and executes the reception process of the delivery confirmation mail at the step S105.

A description will now be given of the third embodiment of the reception process of the delivery confirmation mail at the step S105 in FIG. 3 with reference to FIG. 22, corresponding to the third embodiment of the mail transmitting process shown in FIG. 21.

At a step S1001 in FIG. 22, the network facsimile device NFA extracts the file number, in this case, "0001", from the "Subject:" field of the mail header in the mail sent by the NFA that is located in the text part of the received delivery confirmation mail shown in FIG. 5. For the third embodiment of the reception process of the delivery confirmation mail, the e-mail sent by the NFA is previously processed through the step S905 and the step S906 in FIG. 21.

At a step S1002 in FIG. 22, as shown in FIG. 11, the NFA changes "--" to "OK" in the "result" field of the communication management information corresponding to the file number extracted at the step S1001, indicating that the mail has been delivered to the NFB correctly.

Additionally, at a step S1003, the NFA checks whether the user code corresponding to the communication management information of the extracted file number has been recorded at the step S909 in FIG. 21. If it is ascertained at the step S1003 that the user code is not recorded, at a step S1005, the NFA sends mail notifying of the reception of the delivery confirmation mail, or notification mail as shown in FIG. 13 to the notification address that is initially stored in the RAM 4 as the notification address information 4b shown in FIG. 14.

If it is ascertained at the step S1003 that the user code is recorded, at a step S1004, the NFA reads a mail address corresponding to the recorded user code as a notification address from the user code-mail address conversion table 4c shown in FIG. 23. Subsequently, at the step S1005, the NFA sends the mail notifying of the reception of the delivery confirmation mail, or the notification mail, as shown in FIG. 13 to the notification address.

As described above, the NFA adds the file number that is information for distinguishing between the communication of the mail delivery and other communications when sending the mail with the delivery confirmation request, and subsequently receives the file number as a content of the delivery confirmation mail. Accordingly, the NFA can specify the mail delivery corresponding to the received delivery confirmation mail. Thus, in a case that the NFA sends a plurality of mail with delivery confirmation requests in a short amount of time, it is possible to distinguish each mail delivery easily and correctly by the file number attached to each mail, so as to increase accuracy of the communication management of mail deliveries.

Additionally, in the case that the user code is specified when sending the mail with the delivery confirmation request, the NFA can send the notification mail directly to the mail address corresponding to the user code so as to send notification of the delivery confirmation directly to a user who has sent the mail with the delivery confirmation request.

A description will now be given of a fourth embodiment of the mail transmitting process and of the reception process of the delivery confirmation mail. The fourth embodiment is a combination of the third embodiment of the mail transmitting process shown in FIG. 21 and additional steps shown in FIG. 24. A step S1101 shown in FIG. 24 is processed after the step S908 or the step S909 shown in FIG. 21.

Figure 24:
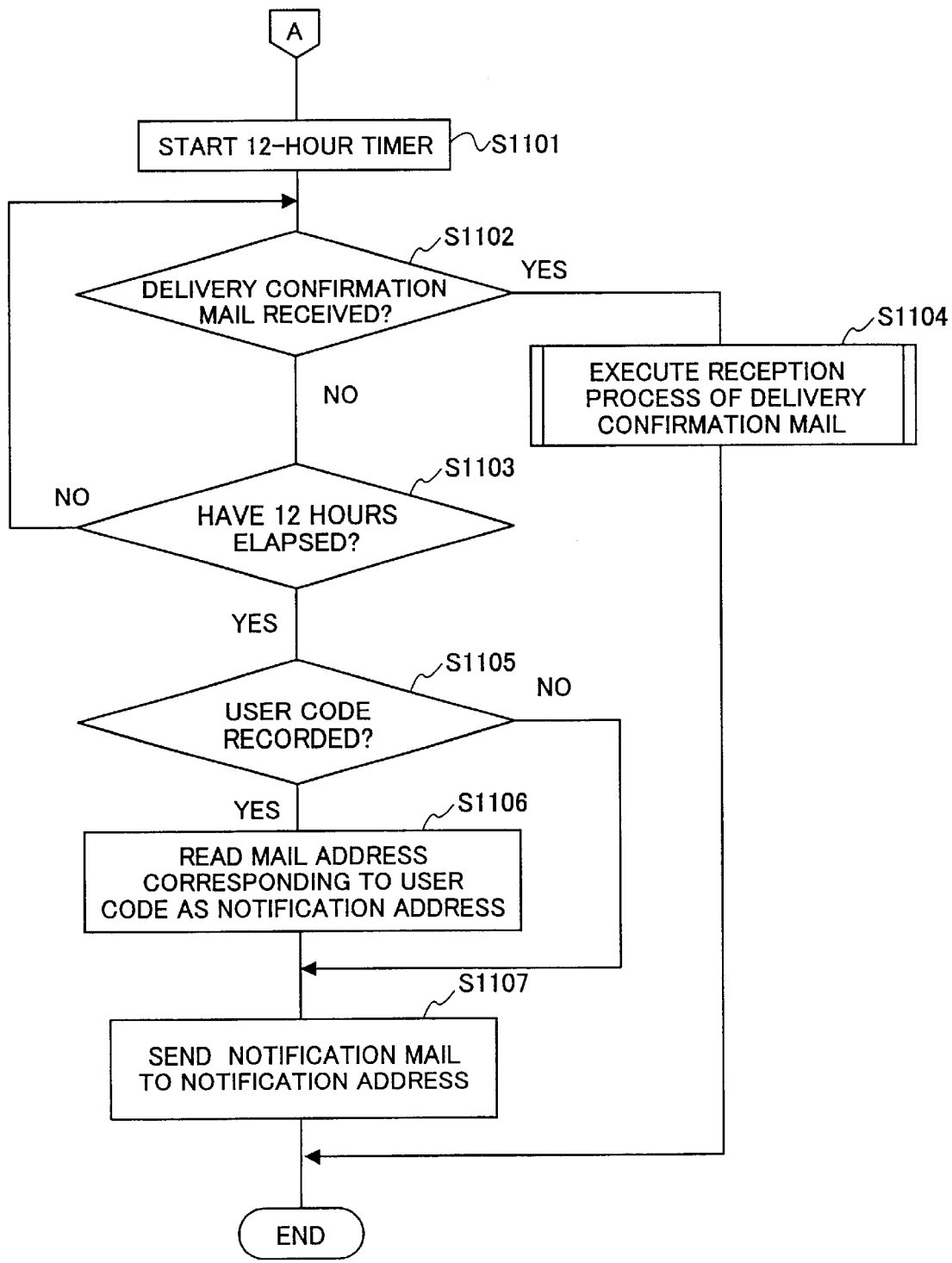
FIG. 24 is a flowchart showing a fourth embodiment of steps of the mail transmission process by the network facsimile device according to the first embodiment of the present invention.

In FIG. 24, the network facsimile device NFA starts a timer, for example, a 12-hour timer, at a step S1101. At a step S1102 and a step S1103, the NFA checks in sequence whether delivery confirmation mail is received by the NFA and whether 12 hours have passed since the timer started at the step S1101.

If it is determined at the step S1102 that the NFA receives the delivery confirmation mail before 12 hours have passed, the NFA proceeds to a step S1104 and executes the reception process of the delivery confirmation mail. The third embodiment of the reception process of the delivery confirmation mail shown in FIG. 22 is applied to the reception process of the delivery confirmation mail at the step S1104.

Figure 25:
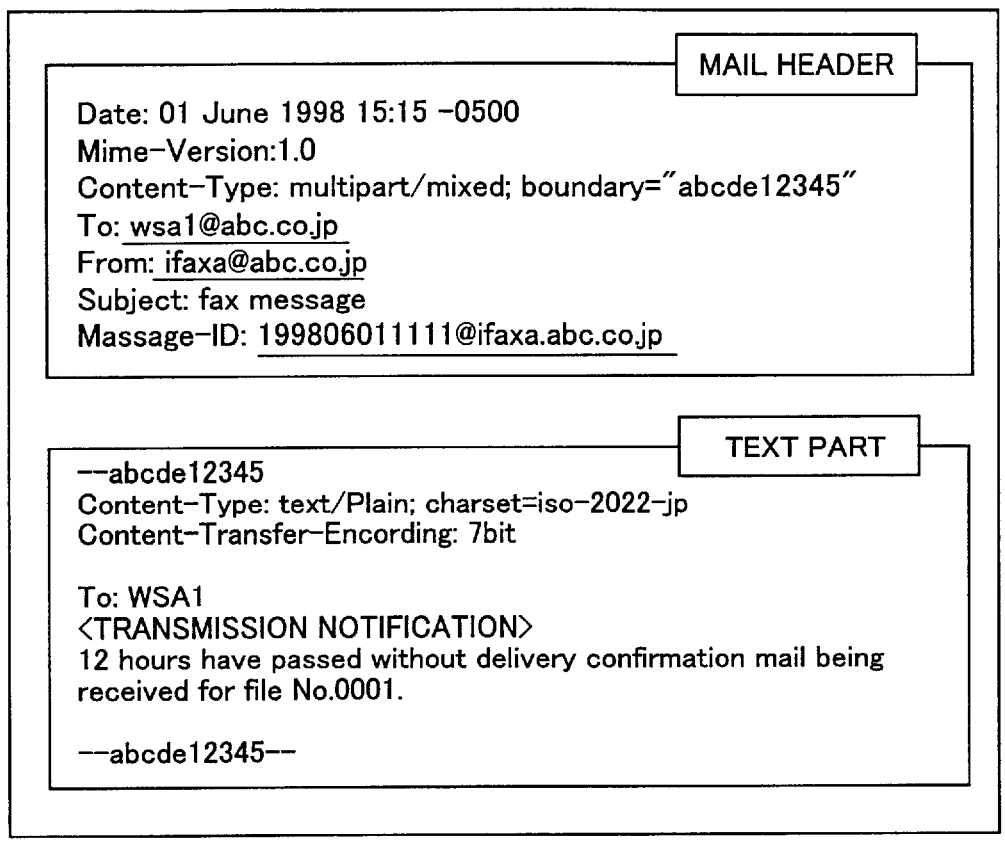
FIG. 25 is a diagram showing a second form of, the notification mail.

If it is determined at the step S1103 that 12 hours have passed without the NFA receiving the delivery confirmation mail, the NFA proceeds to a step S1105 and checks whether the user code has been recorded at the step S909 in FIG. 21. If it is ascertained at the step S1105 that the user code is not recorded, the NFA sends notification mail as shown in FIG. 25 indicating that 12 hours have passed without the NFA receiving the delivery confirmation mail, to the notification address that is initially stored in the RAM 4 as the notification address information 4b shown in FIG. 14.

If it is ascertained at the step S1105 that the user code is recorded, at a step S1106, the NFA reads a mail address corresponding to the recorded user code as a notification address from the user code-mail address conversion table 4c shown in FIG. 23. Subsequently, at a step S1107, the NFA sends the notification mail as shown in FIG. 25 indicating that 12 hours have passed without the NFA receiving the delivery confirmation mail to the notification address.

As described above, the NFA can send notification of the situation that the delivery confirmation mail has not yet been received by the NFA after a long time to a manager of the communication management information or each user of the NFA sending the mail. The timer is set to 12 hours in the process shown in FIG. 24. However, the timer can be set at any other amount of time. Additionally, in the case that the delivery confirmation mail has not yet been received by the NFA after a long time, the NFA can restart the timer after sending notification of the above situation to the manager or the user, and repeats the steps of waiting for the reception of the delivery confirmation mail, finally receiving the delivery confirmation mail, and sending notification of the reception of the delivery confirmation mail to the manager or the user.

The embodiments of the present invention enable the mail transmission result of transmitted mail notified by the delivery confirmation mail or the error mail sent from a mail system on a network, to be managed as a communication result of the communication management information recorded in the communication management table 4a together with other communication management information on the table 4a, and not to be printed out similarly to regular mail by the plotter 6.

In the above-described embodiments, the present invention is applied to the network facsimile device. However, the present invention may also be applied to other communication terminal devices that communicate by using e-mail through a network since the present invention does not depend on data contained in the e-mail. The present invention is not limited to the Internet as a communication network and is not limited by the usage of network protocols or e-mail transmitting and receiving protocols. Additionally, the present invention may also be applied to any communication terminal devices that can receive delivery confirmation mail or error mail from a mail system on a network, and is not limited by reply functions or a format of the delivery confirmation mail or the error mail supplied by the mail system on the network.

Figure 26:
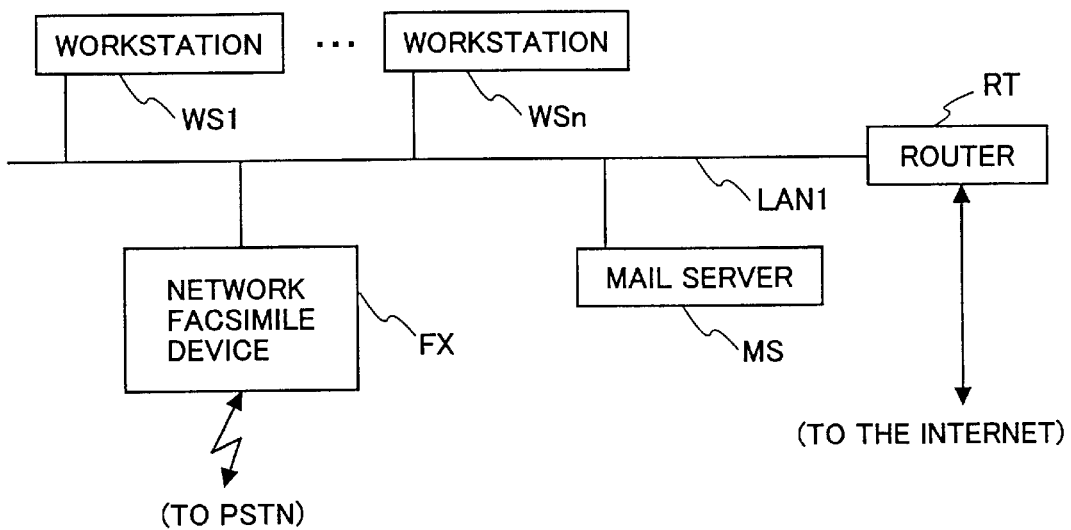
FIG. 26 is a block diagram showing a network system of a network facsimile device FX according to a second embodiment of the present invention.

FIG. 26 shows a network system according to a second embodiment of the present invention.

In FIG. 26, workstations WS1 through WSn, a mail server MS, a network facsimile device FX and a router RT are connected to a local area network LAN1. The above-described components are connected to the Internet through the router RT. Accordingly, the workstations WS1 through WSn, the mail server MS and the network facsimile device FX can exchange data through the network with other appropriate communication terminal devices.

The mail server MS provides services such as collecting and distributing e-mail to the workstations WS1 through WSn and the network facsimile device FX which are connected to the LAN1.

Additionally, the workstations WS1 through WSn are provided with various programs, for example, facsimile application software creating and outputting facsimile image information and software for exchanging data through the LAN1. The workstations WS1 through WSn are used by a specific user or specific users.

The network facsimile device FX includes an e-mail processing function for exchanging image information or various reports as e-mail, and a transmission function for connecting to an analog public network PSTN and for transmitting image information by a G3 facsimile transmission process using the public network as a communication line.

Figure 27:
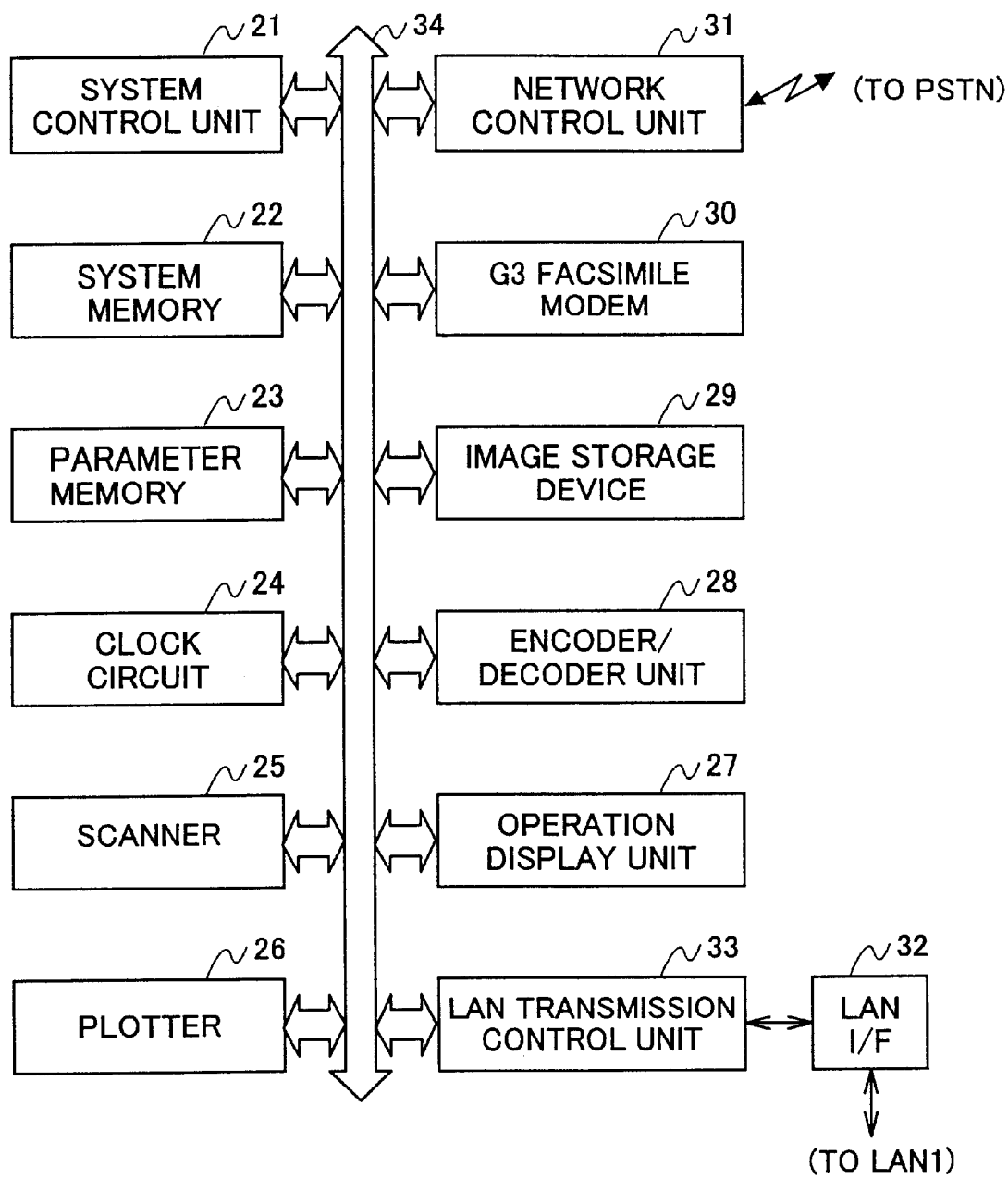
FIG. 27 is a block diagram showing components of the network facsimile device FX according to the second embodiment of the present invention.

FIG. 27 shows a structure of the network facsimile device FX.

The network facsimile device FX includes a system control unit 21, a system memory 22, a parameter memory 23, a clock circuit 24, a scanner 25, a plotter 26, an operation display unit 27, an encoder/decoder unit 28, an image storage device 29, a G3 facsimile modem 30, a network control unit 31, a local area network (LAN) interface 32, a local area network (LAN) transmission control unit 33 and an internal bus 34.

In FIG. 27, the system control unit 21 executes various control processes such as control of each unit in the network facsimile device FX and control of facsimile transmission order. The system memory 22 stores a control program executed by the system control unit 21 and data necessary for the execution of the control program and the like, and is used as a working area for the system control unit 21. The parameter memory 23 stores information specific to the network facsimile device FX. The clock circuit 24 outputs current time information.

The scanner 25 reads a document image at a fixed resolution. The plotter 26 prints out and records an image at a fixed resolution. The operation display unit 27 is used for operating the network facsimile device FX, and is provided with various operational keys and indicators.

The encoder/decoder unit 28 encodes and compresses an image signal, and also decodes and expands encoded image information to the original image signal. The image storage device 29 stores much encoded image information.

The G3 facsimile modem 30 achieves modem functions of a G3 facsimile device and includes a low-speed modem function, for example, a V.21 modem for exchanging a transmission order signal, and a high-speed modem function, for example, a V.17 modem, a V.34 modem, a V.29 modem and a V.27ter modem for exchanging mainly image information.

The network control unit 31 connects the network facsimile device FX to the analog public network PSTN, and includes automatic sending and receiving functions.

The local area network (LAN) interface 32 connects the network facsimile device FX to the local area network LAN1. The local area network (LAN) transmission control unit 33 executes communication control processes of a fixed protocol suite for exchanging various data through the local area network LAN1 with other data terminal devices.

The system control unit 21, the system memory 22, the parameter memory 23, the clock circuit 24, the scanner 25, the plotter 26, the operation display unit 27, the encoder/decoder unit 28, the image storage device 29, the G3 facsimile modem 30, the network control unit 31 and the local area network (LAN) transmission control unit 33 are connected to the internal bus 34. Additionally, each unit exchanges data through the internal bus 34.

Additionally, the network control unit 31 and the G3 facsimile modem 30 exchange data directly with each other.

In the second embodiment of the present invention, a protocol suite that is a combination of a transmission protocol TCP/IP for layers up to a transport layer and a communication protocol for the higher layers is applied to data exchange between terminal devices connected to the LAN1. For instance, SMTP is applied to e-mail data exchange as a communication protocol for the layers higher than the transport layer.

Additionally, a protocol such as POP can be applied to the mail server MS to confirm a reception of e-mail for an individual user and to request obtaining the e-mail through a network.

Additionally, communication protocols such as TCP/IP, SMTP and POP, a data format and a data structure of e-mail are regulated by an RFC document published by IETF. For example, TCP, IP and SMTP are regulated respectively by RFC 793, RFC 793 and RFC 821. The data format of the e-mail is regulated by RFC 822, RFC 1521 and RFC 1522 (MIME format).

The network facsimile device FX has a transmission function to transmit a read document image to other G3 facsimile devices through the analog public network PSTN, and to users of the workstations WS1 through WSn or other network facsimile devices FX through the LAN1 and the Internet. The network facsimile device FX additionally has forwarding service functions to forward with use of e-mail, image information received from other G3 facsimile devices through the analog public network PSTN to a user corresponding to the sub-address specified, and to forward image information received from the workstation WS connected to the LAN1 to the specified G3 facsimile device connected to the analog public network PSTN.

Additionally, the network facsimile device FX obtains image information from mail text information of e-mail received at its own terminal device, and prints the image information out.

Since facsimile image information is binary data and cannot be directly included in the e-mail, the facsimile image information is included in the e-mail by being converted to readable information (7 bits character code) by applying a fixed conversion method, for example, a BASE 64 encoding method.

Figures 28, 29:
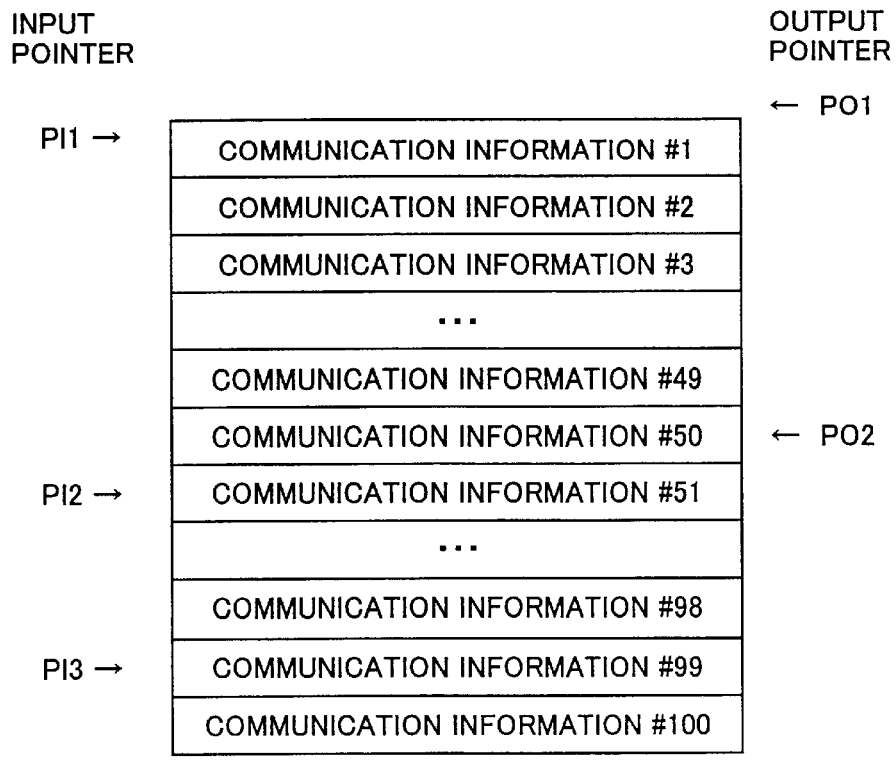
FIG. 28 is a diagram showing one form of communication information.
FIG. 29 is a diagram showing one form of a send/receive history information table.

Additionally, in the second embodiment of the present invention, the network facsimile device FX creates communication information as shown in FIG. 28 every time the device FX sends or receives image information, and stores the communication information in a send/receive history information table as shown in FIG. 29.

The above-described communication information includes information about a communication reference number, a starting date/time, a communication time, a total number of pages, a file number, an address file ID, a classification, a line density, a time specification, a send/ receive distinction and a communication result.

The communication reference number is provided to the communication information for distinguishing each communication. The starting date/time shows a date and a time the communication starts. The communication time indicates a period of time the communication is being processed. The total number of pages shows the total number of pages sent or received by the communication. The file number shows the file number of an image information file sent or received by the communication. The address file ID shows an ID used for specifying a destination address. The classification shows a communication classification for storing a communication mode of the communication. The line density is a line density of the image information. The time specification shows whether the date and the time to start the communication are specified or not. The send/receive distinction is provided for determining whether the communication is transmission (send) or reception (receive) of the image information file. The communication result shows a result of the communication.

Additionally, in the second embodiment of the present invention, the send/receive history information table is structured to be able to store a hundred sets of communication information, and is used similarly to a ring buffer. Additionally, the send/receive history information table includes an input pointer PI and an output pointer PO. The input pointer PI is for indicating an area wherein new communication information is stored. The output pointer PO is for indicating the last area of areas with communication information that are printed out as a communication management report not shown in figures.

Accordingly, in a case that no communication information is stored in the send/receive history information table and no communication management report is printed out, the input pointer PI is set at a position PI1 pointing to the first communication information #1, and the output pointer PO is set at an initial location PO1.

When new communication information is created and stored in the area pointed to by the input pointer PI in the send/receive history information table, the input pointer PI1 points to the next following area.

As described above, the communication information is stored in the send/receive history information table. The network facsimile device FX creates a communication management report based on fifty sets of the communication information after storing the fifty sets of the communication information, and prints out the report by the plotter 26.

At the time, the input pointer PI is set to a location PI2 pointing to the fifty-first communication information #51, and the output pointer PO is set to a location PO2 pointing to the fiftieth communication information #50.

Additionally, the communication management report is separated into an upper part providing information about image information file transmissions and a lower part providing information about image information file receptions. Almost all the contents of the communication information are displayed on both parts of the communication management report.

As described above, a system to send delivery confirmation mail back to a sender of e-mail for confirming whether the e-mail has been delivered from the sender to a destination address correctly is applied as an extended function of an e-mail system on the Internet.

As the system to send the delivery confirmation mail, DSN (Delivery Status Notification) regulated by RFC 1891 and RFC 1894 or MDN (Message Delivery Notification) regulated by RFC 2298 are used practically.

DSN is used generally for confirming the transmission of e-mail to the mail server MS, and MDN is used generally for confirming the transmission of the e-mail to reception terminals. Accordingly, DSN functions are loaded regularly to the mail server MS, and the MDN functions are regularly loaded to the network facsimile device FX, which is a terminal device.

In the second embodiment of the present invention, in a case that a terminal device such as the network facsimile device FX receives a transmission confirmation mail by MDN or a delivery confirmation mail, a "Disposition-Notification-To:" field is included in the mail header information of e-mail with image information sent by the terminal device. The mail address of the terminal device is attached to the "Disposition-Notification-To:" field. Whenever sending the e-mail with the image information, the terminal device always executes the mail delivery confirmation by MDN in the second embodiment of the present invention.

Additionally, in the second embodiment of the present invention, the file number of the image information is attached to a "Message-ID:" field included in the mail header information of the e-mail with the image information sent by the terminal device. The file number of the image information is determined by an acknowledged method so as not to repeat the same file number.

On the other hand, the mail header information of the delivery confirmation mail by MDN includes a "Final-Recipient:" field and an "Original-Message-ID:" field. The "Final-Recipient:" field includes a content indicating that a user has displayed or processed the e-mail requesting MDN. The "Original-Message-ID:" field includes the same file number as one in the "Message-ID:" field of the e-mail requesting MDN.

Accordingly, in the case that the received e-mail includes the "Final-Recipient:" field, the network facsimile device FX can determine the received e-mail as the delivery confirmation mail by MDN. The above-described method to determine whether the received e-mail is the delivery confirmation mail is referred to as a delivery confirmation mail determining method.

Additionally, the network facsimile device FX can determine which e-mail sent with the image information corresponds to the delivery confirmation mail by retrieving the communication information with the same file number as one in the "Original-Message-ID" field of the delivery confirmation mail. This method to find the corresponding e-mail with the image information is referred to as a corresponding e-mail determining method.

In the communication information corresponding to the e-mail sent with the image information, the communication result is initially set to an unknown sign "--". In the case that the network facsimile device FX receives the delivery confirmation mail corresponding to the e-mail sent with the image information, the device FX rewrites "--" in the communication result of the communication information to "OK" indicating that the mail delivery is successful.

It should be noted that, hereinafter, e-mail sent with image information is referred to as e-mail with image.

The file number in the communication information corresponding to the reception of the delivery confirmation mail is written with the file number of the corresponding e-mail with image.

Accordingly, the part providing communication results of the e-mail with image on the printed communication management report displays "OK" if the network facsimile device FX has received the delivery
confirmation mail corresponding to the e-mail with image, and displays "--" if the device FX has not received the corresponding delivery confirmation mail, so that a user can clearly know the condition of the image information communication.

Additionally, the mail reception history part of the communication management report includes the communication information of the delivery confirmation mail with the same file number as the e-mail with image so that a user can clearly determine which e-mail with image corresponds to the delivery confirmation mail.

A single sign can be added to the parts displaying the delivery confirmation mail and the e-mail with the image on the communication management report so as to clarify the delivery confirmation mail and the corresponding e-mail with image.

Figure 30:
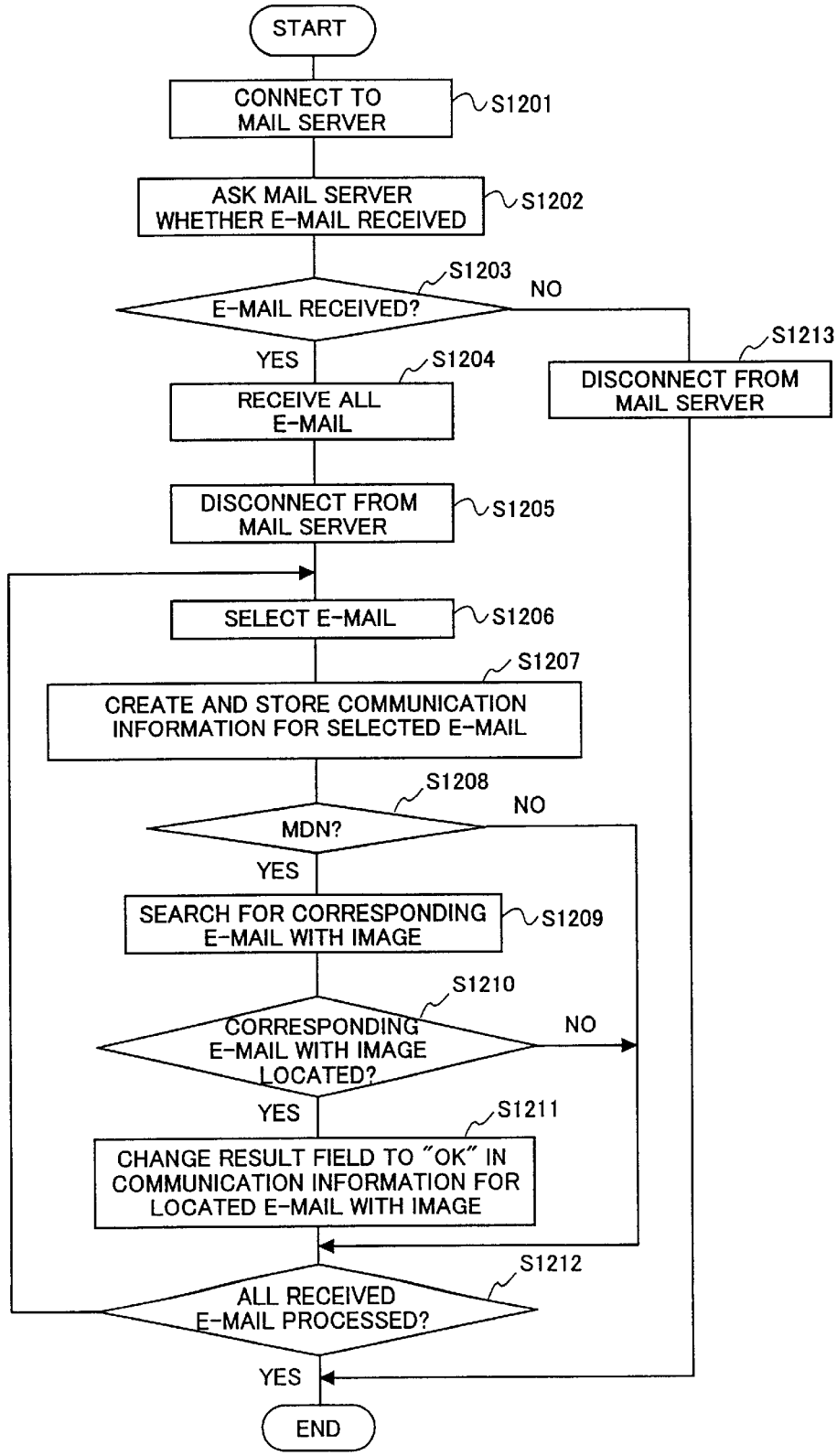
FIG. 30 is a flowchart showing a first embodiment of a mail reception process by the network facsimile device FX.

FIG. 30 shows a first embodiment of an e-mail reception process in the above-described case. This e-mail reception process is performed repeatedly in a fixed time interval.

As shown in FIG. 30, the network facsimile device FX initially connects to the mail server MS at a step S1201. Subsequently, at a step S1202, the network facsimile device FX asks the mail server MS whether e-mail for a terminal device connected to the LAN1 has been received by the mail server MS.

If it is ascertained at a step S1203 that the mail for the terminal device has not been received by the mail server MS, the network facsimile device FX proceeds to a step S1213 and disconnects from the mail server MS. Subsequently, the device FX terminates the e-mail reception process. If it is ascertained at the step S1203 that the mail for the terminal device has been received by the mail server MS, the device FX obtains all the received e-mail at a step S1204. Subsequently, at a step S1205, the device FX disconnects from the mail server MS.

At a step S1206, the network facsimile device FX selects one e-mail from the received e-mail. At a step S1207, the device FX creates communication information for the selected e-mail, and stores the communication information in the send/receive history information table. Additionally, at a step S1208, the device FX checks whether the selected e-mail is delivery confirmation mail by MDN by the above-described delivery confirmation mail determining method. If it is ascertained at the step S1208 that the selected e-mail is not the delivery confirmation mail by MDN, the device FX proceeds to a later-described step S1212. If it is ascertained at the step S1208 that the selected e-mail is the delivery confirmation mail by MDN, the device FX searches e-mail with image corresponding to the delivery confirmation mail by the above-described corresponding e-mail determining method at a step S1209.

If the corresponding e-mail with image is not located at a step S1210, the device FX proceeds to the later described step S1212. If the corresponding e-mail with image is located at the step S1210, the device FX changes the communication result field from "--" to "OK" in the communication information corresponding to the e-mail with image at a step S1211. At the same time, the device FX changes the file number in the communication information corresponding to the delivery confirmation mail to the same number as one in the communication information of the located e-mail with image.

At the step S1212, the network facsimile device FX checks whether the e-mail reception process has been performed for every received e-mail. If the e-mail reception process for all received e-mail is not yet finished, the device FX shifts back to the step S1206 and executes the e-mail reception process to the next received e-mail. The device FX repeats the above-described e-mail reception process until the device FX ascertains that the e-mail reception process has been performed for every received e-mail at the step S1212. Finally, the device FX terminates the e-mail reception process.

Now, there is a case that the network facsimile device FX receives delivery confirmation mail that corresponds to e-mail with image after the communication management report including the communication information about the e-mail with image is printed out.

In this case, the communication information about the e-mail with image and the communication information about the corresponding delivery confirmation mail are not included in the same communication management report according to the above-described embodiment so that a user is unable to clearly know whether the mail delivery is confirmed.

The mail reception process can be modified as follows in order to avoid the situation above. In a case that no e-mail with image corresponding to the delivery confirmation mail exists between the input pointer PI and the output pointer PO in the send/receive history information table when the network facsimile device FX receives the delivery confirmation mail, the deice FX stores the communication information about the e-mail with image again in the send/receive history information table, for instance, at the location PI3 pointed to by the input pointer PI as shown in FIG. 29.

Accordingly, the communication information about the e-mail with image and the communication information about the corresponding delivery confirmation mail are included in the same communication management report that is printed out the next time so that a user is able to clearly know whether the mail delivery is confirmed. Additionally, the communication management report includes the time and the date of receiving the delivery confirmation mail so that the user can easily recognize the time and the date of the mail delivery confirmation.

FIG. 31 shows a second embodiment of the e-mail reception process in the above-described case. This e-mail reception process is performed repeatedly in a fixed time interval.

As shown in FIG. 31, the network facsimile device FX initially connects to the mail server MS at a step S1301. Subsequently, at a step S1302, the network facsimile device FX asks the mail server MS whether e-mail for a terminal device connected to the LAN1 has been received by the mail server MS.

If it is ascertained at a step S1303 that the mail for the terminal device has not been received by the mail server MS, the network facsimile device FX proceeds to a step S1315 and disconnects from the mail server MS. Subsequently, the device FX terminates the e-mail reception process. If it is ascertained at the step S1303 that the mail for the terminal device has been received by the mail server MS, the device FX obtains all the received e-mails at a step S1304. Subsequently, at a step S1305, the device FX disconnects from the mail server MS.

At a step S1306, the network facsimile device FX selects one e-mail from the received e-mail. At a step S1307, the device FX creates communication information for the selected e-mail, and stores the communication information in the send/receive history information table. Additionally, at a step S1308, the device FX checks whether the selected e-mail is delivery confirmation mail by MDN by the above-described delivery confirmation mail determining method. If it is ascertained at the step S1308 that the selected e-mail is not the delivery confirmation mail by MDN, the device FX proceeds to a later-described step S1314. If it is ascertained at the step S1308 that the selected e-mail is the delivery confirmation mail by MDN, the device FX searches for an e-mail with image corresponding to the delivery confirmation mail by the above-described corresponding e-mail determining method at a step S1309.

If the corresponding e-mail with image is not located at a step S1310, the device FX proceeds to the later-described step S1314. If the corresponding e-mail with image is located at the step S1310, the device FX additionally checks whether the communication information about the e-mail with image is located between the input pointer PI and the output pointer PO in the send/receive history information table at a step S1311.

If it is ascertained at the step S1311 that the communication information about the e-mail with image is not located between the input pointer PI and the output pointer PO in the table, the device FX changes the communication result field from "--" to "OK" in the communication information corresponding to the e-mail with image, and copies the communication information about the e-mail with image to a new location in the send/receive history information table at a step S1312.

If it is ascertained at the step S1311 that the communication information about the e-mail with image is located between the input pointer PI and the output pointer PO in the table, the device FX changes the communication result field from "--" to "OK" in the communication information corresponding to the e-mail with image at a step S1313.

At the steps S1312 and S1313, the device FX additionally changes the file number in the communication information corresponding to the delivery confirmation mail to the same number as the one in the communication information of the located e-mail with image.

Subsequently, at the step S1314, the network facsimile device FX checks whether the e-mail reception process has been performed for every received e-mail. If the e-mail reception process for all received e-mail is not yet are finished, the device FX shifts back to the step S1306 and executes the e-mail reception process for the next received e-mail. The device FX repeats the above-described e-mail reception process until the device FX ascertains that the e-mail reception process has been performed for every received e-mail at the step S1314. Finally, the device FX terminates the e-mail reception process.

It should be noted that although in above-described embodiments the network facsimile device FX confirms a mail delivery with use of delivery confirmation mail by MDN, a delivery confirmation mail by DSN may be used instead of the delivery confirmation mail by MDN.

Additionally, it should be noted that although in above-described embodiments the network facsimile device FX is connected to the Internet through the local area network LAN1, the network facsimile device FX may also be connected to the Internet by a dial-up connection.

Additionally, it should be noted that although in above-described embodiments the G3 facsimile function is included in the network facsimile device, a G4 facsimile function may instead be included in the network facsimile device.

Additionally, it should be noted that although in above-described embodiments a hundred sets of communication information are stored in the send/receive history information table and the network facsimile device FX creates a communication management report for every fifty sets stored therein, the number of elements stored and the number of elements placed in the report are not limited to the above specific numbers. Additionally, the contents of the communication information are also not limited to the above-described format.

Additionally, it should be noted that although in above-described embodiments the present invention is adapted for the network facsimile device, the present invention may also be adapted for any applied field in which the mail delivery confirmation may be utilized with regard to exchanging e-mail.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the invention.

The present application is based on Japanese Priority Application No. 11-271053, filed on Sep. 24, 1999, No. 11-295532, filed on Oct. 18, 1999, No. 2000-006475, filed on January 14 and No. 2000-122891, filed on April 24, the entire contents of which are hereby incorporated by reference.

What is claimed is:

1. A communication terminal device that transmits electronic mail through a network by a mail system thereon, said communication terminal device comprising:
    a communication management table storing communication management information related to a communication using the electronic mail through the network, said communication management information including a communication result, said communication management table including
    a send/receive history information table storing management information concerning communications performed by said communication terminal device in an order of occurrences thereof, the thus-stored management information, not yet output, being output therefrom when a number of sets of the management information stored therein reaches a predetermined amount;
    a communication management report outputting unit that creates and visually outputs report data based on stored contents of said communication management table;
    a delivery confirmation mail detecting unit that detects delivery confirmation mail returned from the mail system on the network, said delivery confirmation mail corresponding to the electronic mail transmitted by the mail system; and
    a communication result adding unit that adds information indicating a communication success as the communication result in the communication management information related to the communication using the electronic mail, which communication management information is stored in said communication management table if said delivery confirmation mail detecting unit detects the delivery confirmation mail,
    wherein when said communication terminal device receives the delivery confirmation mail, management information of the transmitted electronic mail corresponding to the delivery confirmation mail is stored again in the send/receive history information table in a case where the management information of the transmitted electronic mail has already been output therefrom.

2. The communication terminal device as claimed in claim 1, further comprising an error mail detecting unit that detects error mail returned from the mail system, said error mail corresponding to the electronic mail transmitted by the mail system,
    wherein, said communication result adding unit adds information indicating a communication failure as the communication result in the communication management information related to the communication using the electronic mail, which communication management information is stored in said communication management table, if said error mail detecting unit detects the error mail.

3. The communication terminal device as claimed in claim 1, further comprising a delivery-confirmation-notifying unit that transmits delivery-confirmation-notifying mail to a fixed mail address by the mail system if said delivery confirmation mail detecting unit detects the delivery confirmation mail.

4. The communication terminal device as claimed in claim 3, further comprising an unconfirmed-delivery-notifying unit that transmits unconfirmed-delivery-notifying mail notifying that a mail delivery is not confirmed in a fixed time to the fixed mail address by the mail system if said delivery confirmation mail detecting unit does not detect the delivery confirmation mail in the fixed time after the electronic mail is transmitted by the mail system.

5. The communication terminal device as claimed in claim 3, further comprising:
    a user-identification information/mail address conversion table storing user-identification information for each user and a mail address corresponding to the user-identification information; and
    a user-identification information recording unit that records the user-identification information that is specified when the electronic mail is transmitted by the mail system, with the communication management information related to the communication using the electronic mail, which communication management information is stored in said communication management table,
    wherein, said delivery-confirmation-notifying unit transmits the delivery-confirmation-notifying mail by the mail system to the mail address stored on said user-identification information/mail address conversion table if said delivery confirmation mail detecting unit detects the delivery confirmation mail, said mail address corresponding to the user-identification information that is recorded by said user-identification information recording unit.

6. The communication terminal device as claimed in claim 5, further comprising an unconfirmed-delivery-notifying unit that transmits unconfirmed-delivery-notifying mail notifying that the mail delivery is not confirmed in the fixed time to the mail address stored on said user-identification information/mail address conversion table by the mail system if said delivery confirmation mail detecting unit does not detect the delivery confirmation mail in the fixed time after the electronic mail is transmitted by the mail system, said mail address corresponding to the user-identification information that is recorded by said user-identification information recording unit.

7. The communication terminal device as claimed in claim 1, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

8. A communication terminal device that transmits electronic mail through a network by a mail system thereon, said communication terminal device comprising:
    a communication management table storing communication management information related to a communication using the electronic mail through the network, said communication management information including a communication result, said communication management table including
    a send/receive history information table storing management information concerning communications performed by said communication terminal device in an order of occurrences thereof, the thus-stored management information, not yet output being output therefrom when a number of sets of the management information stored therein reaches a predetermined amount;
    a communication management report outputting unit that creates and visually outputs report data based on stored contents of said communication management table;

a delivery confirmation mail detecting unit that detects delivery confirmation mail returned from the mail system on the network, said delivery confirmation mail corresponding to the electronic mail transmitted by the mail system;

a file managing unit that attaches a file number for identifying each mail transmission to a part in the electronic mail transmitted by the mail system which part is later returned as contents of the delivery confirmation mail from the mail system, and records the file number with the communication management information related to the communication using the electronic mail, which communication management information is stored in said communication management table; and a communication result adding unit that adds information indicating a communication success as the communication result in the communication management information corresponding to the file number included in the detected delivery confirmation mail, which communication management information is stored in said communication management table, if said delivery confirmation mail detecting unit detects the delivery confirmation mail, wherein when said communication terminal device receives the delivery confirmation mail, management information of the transmitted electronic mail corresponding to the delivery confirmation mail is stored again in the send/receive history information table in a case where the management information of the transmitted electronic mail has already been output therefrom.

9. The communication terminal device as claimed in claim 8, further comprising delivery-confirmation-notifying unit that transmits a delivery-confirmation-notifying mail to a fixed mail address by the mail system if said delivery confirmation mail detecting unit detects the delivery confirmation mail.

10. The communication terminal device as claimed in claim 9, further comprising an unconfirmed-delivery-notifying unit that transmits unconfirmed-delivery-notifying mail notifying that a mail delivery is not confirmed in a fixed time to the fixed mail address by the mail system if said delivery confirmation mail detecting unit does not detect the delivery confirmation mail in the fixed time after the electronic mail is transmitted by the mail system.

11. The communication terminal device as claimed in claim 9, further comprising:

a user-identification information/mail address conversion table storing user-identification information for each user and a mail address corresponding to the user-identification information; and a user-identification information recording unit that records the user-identification information that is specified when the electronic mail is transmitted by the mail system, with the communication management information related to the communication using the electronic mail, which communication management information is stored in said communication management table, wherein, said delivery-confirmation-notifying unit transmits the delivery-confirmation-notifying mail by the mail system to the mail address stored on said user-identification information/mail address conversion table if said delivery confirmation mail detecting unit detects the delivery confirmation mail, said mail address corresponding to the user-identification information that is recorded by said user-identification information recording unit.

12. The communication terminal device as claimed in claim 11, further comprising an unconfirmed-delivery-notifying unit that transmits unconfirmed-delivery notifying mail notifying that a mail delivery is not confirmed in a fixed time to the mail address stored on said user-identification information/mail address conversion table by the mail system if said delivery confirmation mail detecting unit does not detect the delivery confirmation mail in the fixed time after the electronic mail is transmitted by the mail system, said mail address corresponding to the user-identification information that is recorded by said user-identification information recording unit.

13. The communication terminal device as claimed in claim 8, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

14. A communication terminal device that transmits electronic mail through a network by a mail system thereon, said communication terminal device comprising:

a communication management table storing communication management information related to a communication using the electronic mail through the network, said communication management information including a communication result, said communication management table including a send/receive history information table storing management information concerning communications performed by said communication terminal device in an order of occurrences thereof, the thus-stored management information, not yet output, being output therefrom when a number of sets of the management information stored therein reaches a predetermined amount;

a communication management report outputting unit that creates and visually outputs report data based on stored contents of said communication management table;

a delivery confirmation mail detecting unit that detects delivery confirmation mail returned from the mail system on the network, said delivery confirmation mail corresponding to the electronic mail transmitted by the mail system;

an error mail detecting unit that detects error mail returned from the mail system, said error mail corresponding to the electronic mail transmitted by the mail system;

a file managing unit that attaches a file number for identifying each mail transmission to a part in the electronic mail transmitted by the mail system which part is later returned as contents of the delivery confirmation mail from the mail system, and records the file number with the communication management information related to the communication using the electronic mail, which communication management information is stored in said communication management table; and a communication result adding unit that adds information indicating a communication success as the communication result in the communication management information corresponding to the file number included in the detected delivery confirmation mail, which communication management information is stored in said communication management table, if said delivery confirmation mail detecting unit detects the delivery confirmation mail, wherein, said communication result adding unit adds information indicating a communication failure as the communication result in the communication management information related to the communication using the electronic mail, which communication management information is stored in said communication management table, if said error mail detecting unit detects the error mail, and wherein when said communication terminal device receives the delivery confirmation mail, management information of the transmitted electronic mail corresponding to the delivery confirmation mail is stored again in the send/receive history information table in a case where the management information of the transmitted electronic mail has already been output therefrom.

15. The communication terminal device as claimed in claim 14, further comprising a delivery-confirmation-notifying unit that transmits delivery-confirmation-notifying mail to a fixed mail address by the mail system if said delivery confirmation mail detecting unit detects the delivery confirmation mail.

16. The communication terminal device as claimed in claim 15, further comprising an unconfirmed-delivery-notifying unit for transmitting unconfirmed-delivery-notifying mail notifying that a mail delivery is not confirmed in a fixed time to the fixed mail address by the mail system if said delivery confirmation mail detecting unit does not detect the delivery confirmation mail in the fixed time after the electronic mail is transmitted by the mail system.

17. The communication terminal device as claimed in claim 15, further comprising:

a user-identification information/mail address conversion table storing user-identification information for each user and a mail address corresponding to the user-identification information; and a user-identification information recording unit that records the user-identification information that is specified when the electronic mail is transmitted by the mail system, with the communication management information related to the communication using the electronic mail, which communication management information is stored in said communication management table, wherein, said delivery-confirmation-notifying unit transmits the delivery-confirmation-notifying mail by the mail system to the mail address stored on said user-identification information/mail address conversion table if said delivery confirmation mail detecting unit detects the delivery confirmation mail, said mail address corresponding to the user-identification information that is recorded by said user-identification information recording unit.

18. The communication terminal device as claimed in claim 17, further comprising an unconfirmed-delivery-notifying unit that transmits unconfirmed-delivery-notifying mail notifying that a mail delivery is not confirmed in a fixed time to the mail address stored on said user-identification information/mail address conversion table by the mail system if said delivery confirmation mail detecting unit does not detect the delivery confirmation mail in the fixed time after the electronic mail is transmitted by the mail system, said mail address corresponding to the user-identification information that is recorded by said user-identification information recording unit.

19. The communication terminal device as claimed in claim 14, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

20. A method for controlling a communication terminal device that transmits electronic mail through a network by a mail system thereon, said communication terminal device comprising a communication management table storing communication management information related to a communication using the electronic mail through the network, said communication management information including a communication result, said communication management table including a send/receive history information table for storing management information concerning communications performed by the communication terminal device in an order of occurrences thereof, said method comprising the steps of:

creating and outputting visually report data based on stored contents of said communication management table, including outputting the management information stored in the send/receive history information table, when a number of sets of the management information stored in the send/receive history information table reaches a predetermined amount;

detecting delivery confirmation mail returned from the mail system on the network, said delivery confirmation mail corresponding to the electronic mail transmitted by the mail system;

adding information indicating a communication success as the communication result in the communication management information related to the communication using the electronic mail, which communication management information is stored in said communication management table, if the delivery confirmation mail is detected; and storing the management information of the transmitted electronic mail corresponding to the delivery confirmation mail again in the send/receive history information table, when the communication terminal device receives the delivery confirmation mail, in a case where the management information of the transmitted electronic mail has already been output therefrom.

21. The method for controlling the communication terminal device as claimed in claim 20, further comprising the steps of:

detecting error mail returned from the mail system, said error mail corresponding to the electronic mail transmitted by the mail system; and adding information indicating a communication failure as the communication result in the communication management information related to the communication using the electronic mail, which communication management information is stored in said communication management table, if the error mail is detected.

22. The method for controlling the communication terminal device as claimed in claim 20, further comprising the step of transmitting delivery-confirmation-notifying mail to a fixed mail address by the mail system if the delivery confirmation mail is detected.

23. The method for controlling the communication terminal device as claimed in claim 22, further comprising the step of transmitting unconfirmed-delivery-notifying mail notifying that a mail delivery is not confirmed in a fixed time to the fixed mail address by the mail system if the delivery confirmation mail is not detected in the fixed time after the electronic mail is transmitted by the mail system.

24. The method for controlling the communication terminal device as claimed in claim 22, said communication terminal device comprising a user-identification information/mail address conversion table storing user-identification information for each user and a mail address corresponding to the user-identification information, said method further comprising the steps of:
recording the user-identification information that is specified when the electronic mail is transmitted by the mail system, with the communication management information related to the communication using the electronic mail, which communication management information is stored in said communication management table; and
transmitting the delivery-confirmation-notifying mail by the mail system to the mail address stored on said user-identification information/mail address conversion table if the delivery confirmation mail is detected, said mail address corresponding to the recorded user-identification information.

25. The method for controlling the communication terminal device as claimed in claim 24, further comprising the step of transmitting unconfirmed-delivery-notifying mail notifying that a mail delivery is not confirmed in the fixed time to the mail address stored on said user-identification information/mail address conversion table by the mail system if the delivery confirmation mail is not detected in the fixed time after the electronic mail is transmitted by the mail system, said mail address corresponding to the recorded user-identification information.

26. The method as claimed in claim 20, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

27. A method for controlling a communication terminal device that transmits electronic mail through a network by a mail system thereon, said communication terminal device comprising a communication management table storing communication management information related to a communication using the electronic mail through the network, said communication management information including a communication result, said communication management table including a send/receive history information table for storing management information concerning communications performed by the communication terminal device in an order of occurrences thereof, said method comprising the steps of:
creating and visually outputting report data based on stored contents of said communication management table, including
outputting the management information stored in the send/receive history information table, when a number of sets of the management information stored in the send/receive history information table reaches a predetermined amount;
detecting delivery confirmation mail returned from the mail system on the network, said delivery confirmation mail corresponding to the electronic mail transmitted by the mail system;
attaching a file number for identifying each mail transmission to a part in the electronic mail transmitted by the mail system which part is later returned as contents of the delivery confirmation mail from the mail system;
recording the file number with the communication management information related to the communication using the electronic mail, which communication management information is stored in said communication management table;
adding information indicating a communication success as the communication result in the communication management information corresponding to the file number included in the detected delivery confirmation mail, which communication management information is stored in said communication management table, if the delivery confirmation mail is detected; and
storing the management information of the transmitted electronic mail corresponding to the delivery confirmation mail again in the send/receive history information table, when the communication terminal device receives the delivery confirmation mail, in a case where the management information of the transmitted electronic mail has already been output therefrom.

28. The method for controlling the communication terminal device as claimed in claim 27, further comprising the step of transmitting delivery-confirmation-notifying mail to a fixed mail address by the mail system if the delivery confirmation mail is detected.

29. The method for controlling the communication terminal device as claimed in claim 28, further comprising the step of transmitting unconfirmed-delivery-notifying mail notifying that a mail delivery is not confirmed in a fixed time to the fixed mail address by the mail system if the delivery confirmation mail is not detected in the fixed time after the electronic mail is transmitted by the mail system.

30. The method for controlling the communication terminal device as claimed in claim 28, said communication terminal device comprising a user-identification information/mail address conversion table storing user-identification information for each user and a mail address corresponding to the user-identification information, said method further comprising the steps of:
recording the user-identification information that is specified when the electronic mail is transmitted by the mail system, with the communication management information related to the communication using the electronic mail, which communication management information is stored in said communication management table; and
transmitting the delivery-confirmation-notifying mail by the mail system to the mail address stored on said user-identification information/mail address conversion table if the delivery confirmation mail is detected, said mail address corresponding to the recorded user-identification information.

31. The method for controlling the communication terminal device as claimed in claim 30, further comprising the step of transmitting unconfirmed-delivery-notifying mail notifying that a mail delivery is not confirmed in a fixed time to the mail address stored on said user-identification information/mail address conversion table by the mail system if the delivery confirmation mail is not detected in the fixed time after the electronic mail is transmitted by the mail system, said mail address corresponding to the recorded user-identification information.

32. The method as claimed in claim 27, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

33. A method for controlling a communication terminal device that transmits electronic mail through a network by a mail system thereon, said communication terminal device comprising a communication management table storing communication management information related to a communication using the electronic mail through the network, said communication management information including a communication result, said communication management table including a send/receive history information table for storing management information concerning communications performed by the communication terminal device in an order of occurrences thereof, said method comprising the steps of:

creating and visually outputting report data based on stored contents of said communication management table, including outputting the management information stored in the send/receive history information table, when a number of sets of the management information stored in the send/receive history information table reaches a predetermined amount;

detecting delivery confirmation mail returned from the mail system on the network, said delivery confirmation mail corresponding to the electronic mail transmitted by the mail system;

detecting error mail returned from the mail system, said error mail corresponding to the electronic mail transmitted by the mail system;

attaching a file number for identifying each mail transmission to a part in the electronic mail transmitted by the mail system which part is later returned as contents of the delivery confirmation mail from the mail system;

recording the file number with the communication management information related to the communication using the electronic mail, which communication management information is stored in said communication management table;

adding information indicating a communication success as the communication result in the communication management information corresponding to the file number included in the detected delivery confirmation mail, which communication management information is stored in said communication management table, if the delivery confirmation mail is detected;

adding information indicating a communication failure as the communication result in the communication management information related to the communication using the electronic mail, which communication management information is stored in said communication management table if the error mail is detected; and storing the management information of the transmitted electronic mail corresponding to the delivery confirmation mail again in the send/receive history information table, when the communication terminal device receives the delivery confirmation mail, in a case where the management information of the transmitted electronic mail has already been output therefrom.

34. The method for controlling the communication terminal device as claimed in claim 33, further comprising the step of transmitting delivery-confirmation-notifying mail to a fixed mail address by the mail system if the delivery confirmation mail is detected.

35. The method for controlling the communication terminal device as claimed in claim 34, further comprising the step of transmitting unconfirmed-delivery-notifying mail notifying that a mail delivery is not confirmed in a fixed time to the fixed mail address by the mail system if the delivery confirmation mail is not detected in the fixed time after the electronic mail is transmitted by the mail system.

36. The method for controlling the communication terminal device as claimed in claim 34, said communication terminal device comprising a user-identification information/mail address conversion table storing user-identification information for each user and a mail address corresponding to the user-identification information, said method further comprising the steps of:

recording the user-identification information that is specified when the electronic mail is transmitted by the mail system, with the communication management information related to the communication using the electronic mail, which communication management information is stored in said communication management table; and transmitting the delivery-confirmation-notifying mail by the mail system to the mail address stored on said user-identification information/mail address conversion table if the delivery confirmation mail is detected, said mail address corresponding to the recorded user-identification information.

37. The method for controlling the communication terminal device as claimed in claim 36, further comprising the step of transmitting unconfirmed-delivery-notifying mail notifying that a mail delivery is not confirmed in a fixed time to the mail address stored on said user-identification information/mail address conversion table by the mail system if the delivery confirmation mail is not detected in the fixed time after the electronic mail is transmitted by the mail system, said mail address corresponding to the recorded user-identification information.

38. The method as claimed in claim 33, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

39. A network facsimile device comprising:

an image-information exchanging unit that exchanges image information with use of an electronic mail by connecting to the Internet;

an information-table creating unit that creates a send/receive history information table about the electronic mail;

the send/receive history information table storing management information concerning communications performed by said network facsimile device in an order of occurrences thereof, the thus-stored management information, not yet output, being output therefrom when a number of sets of the management information stored therein reaches a predetermined amount;

a report-outputting unit that visibly outputs a communication management report that displays contents of the send/receive history information table as a list;

a MDN-confirmation requesting unit that requests a mail delivery confirmation by MDN when transmitting the image information using the electronic mail; and a controlling unit that displays a content that relates delivery confirmation mail by MDN and transmitted electronic mail corresponding to the delivery confirmation mail by MDN in a field wherein the delivery confirmation mail by MDN is displayed, and in a field wherein the transmitted electronic mail is displayed, when the delivery confirmation mail by MDN is received by said network facsimile device, wherein when said network facsimile device receives the delivery confirmation mail management information of the transmitted electronic mail corresponding to the delivery confirmation mail is stored again in the send/receive history information table in a case where the management information of the transmitted electronic mail has already been output therefrom.

40. The network facsimile device as claimed 29, in claim 39, further comprising:

a report-creating unit that creates the communication management report based on a part of information on said send/receive history information table, which information includes history information about the transmitted electronic mail;

an information-storing unit that stores the history information about said transmitted electronic mail again in another part of said send/receive history information table if the delivery confirmation mail by 10 MDN corresponding to the transmitted electronic mail is received after the communication management report is outputted by said network facsimile device; and an information-including unit that includes the history information about the transmitted electronic mail and the corresponding delivery confirmation mail by MDN together in the communication management report.

41. The network facsimile device as claimed in claim 39, further comprising a time-displaying unit that displays a time and a date of receiving the delivery confirmation mail by MDN in the communication management report.

42. The network facsimile device as claimed in claim 39, wherein an input pointer and an output pointer are used for inputting information to and outputting information from the send/receive history information table, and when the network facsimile device receives the delivery confirmation mail, the management information of the transmitted electronic mail corresponding to the delivery confirmation mail is stored in the send/receive history information table at a location pointed to by the input pointer.

43. A network facsimile device comprising:

an image-information exchanging unit that exchanges image information using electronic mail by connecting to the Internet;

an information-table creating unit that creates a send/receive history information table about the electronic mail;

the send/receive history information table storing management information concerning communications performed by said network facsimile device in an order of occurrences thereof, the thus-stored management information, not yet output, being output therefrom when a number of sets of the management information stored therein reaches a predetermined amount;

a report-outputting unit that visibly outputs a communication management report that displays contents 10 of the send/receive history information table as a list;

a MDN-confirmation requesting unit that requests a mail delivery confirmation by DSN when transmitting the image information using the electronic mail; and a controlling unit that displays a content that relates delivery confirmation mail by DSN and transmitted electronic mail corresponding to the delivery confirmation mail by DSN in a field wherein the delivery confirmation mail by DSN is displayed, and in a field wherein the transmitted electronic mail is displayed, when the delivery confirmation mail by DSN is received by said network facsimile device, wherein when said network facsimile device receives the delivery confirmation mail, management information of the transmitted electronic mail corresponding to the delivery confirmation mail is stored again in the send/receive history information table in a case where the management information of the transmitted electronic mail has already been output therefrom.

44. The network facsimile device as claimed in claim 43, further comprising:

a report-creating unit that creates the communication management report based on a part of the information on said send/receive history information table, which information includes history information about the transmitted electronic mail;

an information-storing unit that stores the history information about said transmitted electronic mail again in another part of said send/receive history information table if the delivery confirmation mail by DSN corresponding to the transmitted electronic mail is received after the communication management report is outputted by said network facsimile device; and an information-including unit that includes the history information about the transmitted electronic mail and the corresponding delivery confirmation mail by DSN together in the communication management report.

45. The network facsimile device as claimed in claim 43, further comprising a time-displaying unit that displays a time and a date of receiving the delivery confirmation mail by DSN in the communication management report.

46. The network facsimile device as claimed in claim 43, wherein an input pointer and an output pointer are used for inputting information to and outputting information from the send/receive history information table, and when the network facsimile device receives the delivery confirmation mail, the management information of the transmitted electronic mail corresponding to the delivery confirmation mail is stored in the send/receive history information table at a location pointed to by the input pointer.

47. A method for controlling a network facsimile device comprising the steps of:

exchanging image information using an electronic mail by connecting to the Internet;

creating a send/receive history information table about the electronic mail and storing management information concerning communications performed by the network facsimile device in an order of occurrences thereof;

outputting visibly a communication management report that displays contents of the send/receive history information table as a list;

requesting a mail delivery confirmation by MDN when transmitting the image information using the electronic mail;

displaying a content that relates delivery confirmation mail by MDN and transmitted electronic mail corresponding to the delivery confirmation mail by MDN to a field wherein the delivery confirmation mail by MDN is displayed, and to a field wherein the transmitted electronic mail is displayed, when the delivery confirmation mail by MDN is received by said network facsimile device;

outputting visually the management information stored in the send/receive history information table, when a number of sets of the management information stored in the send/receive history information table reaches a predetermined amount; and storing the management information of the transmitted electronic mail corresponding to the delivery confirmation mail again in the send/receive history information table, when the communication terminal device receives the delivery confirmation mail, in a case where the management information of the transmitted electronic mail has already been output therefrom.

48. The method for controlling the network facsimile device as claimed in claim 47, further comprising the steps of:

creating the communication management report based on a part of information on said send/receive history information table, which information includes history information about the transmitted electronic mail;

storing the history information about said transmitted electronic mail again in another part of said send/receive history information table if the delivery confirmation mail by MDN corresponding to the transmitted electronic mail is received after the communication management report is outputted by said network facsimile device; and including the history information about the transmitted electronic mail and the corresponding delivery confirmation mail by MDN together in the communication management report.

49. The method for controlling the network facsimile device as claimed in claim 47, further comprising the step of displaying a time and a date of receiving the delivery confirmation mail by MDN in the communication management report.

50. The method as claimed in claim 47, wherein an input pointer and an output pointer are used for inputting information to and outputting information from the send/receive history information table, and when the network facsimile device receives the delivery confirmation mail, the management information of the transmitted electronic mail corresponding to the delivery confirmation mail is stored in the send/receive history information table at a location pointed to by the input pointer.

51. A method for controlling a network facsimile device comprising the steps of:

exchanging image information using an electronic mail by connecting to the Internet;

creating a send/receive history information table about the electronic mail and storing management information concerning communications performed by the network facsimile device in an order of occurrences thereof;

outputting visibly a communication management report that displays contents of the send/receive history information table as a list;

requesting a mail delivery confirmation by DSN when transmitting the image information using the electronic mail;

displaying a content that relates delivery confirmation mail by DSN and transmitted electronic mail corresponding to the delivery confirmation mail by DSN to a field wherein the delivery confirmation mail by DSN is displayed, and to a field wherein the transmitted electronic mail is displayed, when the delivery confirmation mail by DSN is received by said network facsimile device;

outputting visually the management information stored in the send/receive history information table, when a number of sets of the management information stored in the send/receive history information table reaches a predetermined amount; and storing the management information of the transmitted electronic mail corresponding to the delivery confirmation mail again in the send/receive history information table, when the communication terminal device receives the delivery confirmation mail, in a case where the management information of the transmitted electronic mail has already been output therefrom.

52. The method for controlling the network facsimile device as claimed in claim 51, further comprising the steps of:

creating the communication management report based on a part of information on said send/receive history information table, which information includes history information about the transmitted electronic mail;

storing the history information about said transmitted electronic mail again in another part of said send/receive history information table if the delivery confirmation mail by DSN corresponding to the transmitted electronic mail is received after the communication management report is outputted by said network facsimile device; and including the history information about the transmitted electronic mail and the corresponding delivery confirmation mail by DSN together in the communication management report.

53. The method for controlling the network facsimile device as claimed in claim 51, further comprising the step of displaying a time and a date of receiving the delivery confirmation mail by DSN in the communication management report.

54. The method as claimed in claim 51, wherein an input pointer and an output pointer are used for inputting information to and outputting information from the send/receive history information table, and when the network facsimile device receives the delivery confirmation mail, the management information of the transmitted electronic mail corresponding to the delivery confirmation mail is stored in the send/receive history information table at a location pointed to by the input pointer.

55. A communication terminal device that transmits electronic mail through a network by a mail system thereon, said communication terminal device comprising:

a delivery confirmation mail detecting unit that detects delivery confirmation mail corresponding to the electronic mail transmitted by the mail system, said delivery confirmation mail being returned from the mail system on the network;

an error mail detecting unit that detects error mail corresponding to the electronic mail transmitted by the mail system, said error mail being returned from the mail system;

a memory storing communication management information related to an electronic mail transmission execute by the mail system, said communication management information including a communication result of the electronic mail transmission, said memory also storing a send/receive history information table containing management information concerning communications performed by said communication terminal device in an order of occurrences thereof, the thus-stored management information, not yet output, being output therefrom when a number of sets of the management information stored therein reaches a predetermined amount;

a communication result adding unit that adds information indicating a communication success as the communication result to the communication management information, if said delivery confirmation mail detecting unit detects the delivery confirmation mail, and adds information indicating a communication failure as the communication result to the communication management information, if said error mail detecting unit detects the error mail, wherein when said communication terminal device receives the delivery confirmation mail, management information of the transmitted electronic mail corresponding to the delivery confirmation mail is stored again in the send/receive history information table in a case where the management information of the transmitted electronic mail has already been output therefrom.

56. The communication terminal device as claimed in claim 55, wherein an input pointer and an output pointer are used for inputting information to and outputting information from the send/receive history information table, and when the communication terminal device receives the delivery confirmation mail, the management information of the transmitted electronic mail corresponding to the delivery confirmation mail is stored in the send/receive history information table at a location pointed to by the input pointer.

* * * * *